(12) United States Patent
Sutaria et al.

(10) Patent No.: US 8,010,082 B2
(45) Date of Patent: Aug. 30, 2011

(54) FLEXIBLE BILLING ARCHITECTURE

(75) Inventors: Jay Sutaria, Mountain View, CA (US); Sridhar Nanjundeswaran, Mountain View, CA (US); Brian Gustafson, San Carlos, CA (US); Robert van Gent, Redwood City, CA (US)

(73) Assignee: Seven Networks, Inc., Redwood City, CA (US)

( * ) Notice: Subject to any disclaimer, the term of this patent is extended or adjusted under 35 U.S.C. 154(b) by 951 days.

(21) Appl. No.: 11/254,327

(22) Filed: Oct. 19, 2005

(65) Prior Publication Data
US 2006/0084410 A1  Apr. 20, 2006

(51) Int. Cl.
*H04W 4/00* (2009.01)
(52) U.S. Cl. .................. 455/408; 709/206; 709/224
(58) Field of Classification Search .............. 455/405, 455/406, 408; 709/206, 224
See application file for complete search history.

(56) References Cited

U.S. PATENT DOCUMENTS

| | | |
|---|---|---|
| 222,458 A | 12/1879 | Connolly et al. |
| 447,918 A | 3/1891 | Strowger |
| 4,200,770 A | 4/1980 | Hellman et al. |
| 4,255,796 A | 3/1981 | Gabbe et al. |
| 4,276,597 A | 6/1981 | Dissly et al. |
| 4,531,020 A | 7/1985 | Wechselberger et al. |
| 4,807,182 A | 2/1989 | Queen |
| 4,831,582 A | 5/1989 | Miller et al. |
| 4,875,159 A | 10/1989 | Cary et al. |
| 4,897,781 A | 1/1990 | Chang et al. |
| 4,972,457 A | 11/1990 | O'Sullivan |
| 5,008,853 A | 4/1991 | Bly et al. |
| 5,220,657 A | 6/1993 | Bly et al. |
| 5,263,157 A | 11/1993 | Janis |
| 5,283,856 A | 2/1994 | Gross et al. |
| 5,357,431 A | 10/1994 | Nakada et al. |
| 5,384,892 A | 1/1995 | Strong |
| 5,386,564 A | 1/1995 | Shearer et al. |
| 5,392,390 A | 2/1995 | Crozier |
| 5,434,994 A | 7/1995 | Shaheen et al. |
| 5,436,960 A | 7/1995 | Campana, Jr. et al. |
| 5,438,611 A | 8/1995 | Campana, Jr. et al. |
| 5,479,472 A | 12/1995 | Campana, Jr. et al. |
| 5,487,100 A | 1/1996 | Kane |
| 5,493,692 A | 2/1996 | Theimer et al. |

(Continued)

FOREIGN PATENT DOCUMENTS
EP  0772327 A2  5/1997
(Continued)

OTHER PUBLICATIONS

Lotus Development Corporation, *Lotus InterNotes Release 4 Web Publisher: InterNotes Web Publisher Guide*, 1995.

(Continued)

*Primary Examiner* — Pierre-Louis Desir
(74) *Attorney, Agent, or Firm* — Perkins Coie LLP

(57) ABSTRACT

A flexible billing system captures communication events on a more granular level then current communication systems. The captured communication events can then be aggregated into different event categories and combined with other event parameters to provide a wider variety of billing options to mobile network operators. The flexible billing system can be integrated with existing billing and provisioning systems. Thus, subscribers can be billed for enabled data access services and services are only enabled for billable entities.

21 Claims, 11 Drawing Sheets

U.S. PATENT DOCUMENTS

| | | |
|---|---|---|
| 5,519,606 A | 5/1996 | Frid-Nielsen et al. |
| 5,555,376 A | 9/1996 | Theimer et al. |
| 5,559,800 A | 9/1996 | Mousseau et al. |
| 5,572,571 A | 11/1996 | Shirai |
| 5,572,643 A | 11/1996 | Judson |
| 5,574,859 A | 11/1996 | Yeh |
| 5,581,749 A | 12/1996 | Hossain et al. |
| 5,600,834 A | 2/1997 | Howard |
| 5,603,054 A | 2/1997 | Theimer et al. |
| 5,604,788 A | 2/1997 | Tett |
| 5,613,012 A | 3/1997 | Hoffman et al. |
| 5,619,507 A | 4/1997 | Tsuda |
| 5,619,648 A | 4/1997 | Canale et al. |
| 5,623,601 A | 4/1997 | Vu |
| 5,625,670 A | 4/1997 | Campana, Jr. et al. |
| 5,625,815 A | 4/1997 | Maier et al. |
| 5,627,658 A | 5/1997 | Connors et al. |
| 5,630,081 A | 5/1997 | Rybicki et al. |
| 5,631,946 A | 5/1997 | Campana, Jr. et al. |
| 5,632,018 A | 5/1997 | Otorii |
| 5,634,053 A | 5/1997 | Noble et al. |
| 5,647,002 A | 7/1997 | Brunson |
| 5,652,884 A | 7/1997 | Palevich |
| 5,664,207 A | 9/1997 | Crumpler et al. |
| 5,666,530 A | 9/1997 | Clark et al. |
| 5,666,553 A | 9/1997 | Crozier |
| 5,680,542 A | 10/1997 | Mulchandani et al. |
| 5,682,524 A | 10/1997 | Freund et al. |
| 5,684,990 A | 11/1997 | Boothby |
| 5,689,654 A | 11/1997 | Kikinis et al. |
| 5,692,039 A | 11/1997 | Brankley et al. |
| 5,696,903 A | 12/1997 | Mahany |
| 5,701,423 A | 12/1997 | Crozier |
| 5,701,469 A | 12/1997 | Brandli et al. |
| 5,704,029 A | 12/1997 | Wright, Jr. |
| 5,706,211 A | 1/1998 | Beletic et al. |
| 5,706,502 A | 1/1998 | Foley et al. |
| 5,706,507 A | 1/1998 | Schloss |
| 5,710,918 A | 1/1998 | Lagarde et al. |
| 5,713,019 A | 1/1998 | Keaten |
| 5,715,403 A | 2/1998 | Stefik |
| 5,717,925 A | 2/1998 | Harper et al. |
| 5,721,908 A | 2/1998 | Lagarde et al. |
| 5,721,914 A | 2/1998 | DeVries |
| 5,727,202 A | 3/1998 | Kucala |
| 5,729,549 A | 3/1998 | Kostreski et al. |
| 5,729,704 A | 3/1998 | Stone et al. |
| 5,729,735 A | 3/1998 | Meyering |
| 5,742,905 A | 4/1998 | Pepe et al. |
| 5,745,360 A | 4/1998 | Leone et al. |
| 5,752,186 A | 5/1998 | Malackowski et al. |
| 5,752,246 A | 5/1998 | Rogers et al. |
| 5,754,938 A | 5/1998 | Herz et al. |
| 5,757,916 A | 5/1998 | MacDoran et al. |
| 5,758,088 A | 5/1998 | Bezaire et al. |
| 5,758,150 A | 5/1998 | Bell et al. |
| 5,758,322 A | 5/1998 | Rongley |
| 5,758,354 A | 5/1998 | Huang et al. |
| 5,758,355 A | 5/1998 | Buchanan |
| 5,765,171 A | 6/1998 | Gehani et al. |
| 5,778,346 A | 7/1998 | Frid-Nielsen et al. |
| 5,778,361 A | 7/1998 | Nanjo et al. |
| 5,781,614 A | 7/1998 | Brunson |
| 5,781,901 A | 7/1998 | Kuzma |
| 5,781,906 A | 7/1998 | Aggarwal et al. |
| 5,787,430 A | 7/1998 | Doeringer et al. |
| 5,787,441 A | 7/1998 | Beckhardt |
| 5,790,425 A | 8/1998 | Wagle |
| 5,790,790 A | 8/1998 | Smith et al. |
| 5,790,974 A | 8/1998 | Tognazzini |
| 5,793,413 A | 8/1998 | Hylton et al. |
| 5,794,210 A | 8/1998 | Goldhaber et al. |
| 5,799,318 A | 8/1998 | Cardinal et al. |
| 5,802,312 A | 9/1998 | Lazaridis et al. |
| 5,802,454 A | 9/1998 | Goshay et al. |
| 5,802,518 A | 9/1998 | Karaev et al. |
| 5,802,524 A | 9/1998 | Flowers et al. |
| 5,806,074 A | 9/1998 | Souder et al. |
| 5,809,242 A | 9/1998 | Shaw et al. |
| 5,809,415 A | 9/1998 | Rossmann |
| 5,818,437 A | 10/1998 | Grover et al. |
| 5,819,172 A | 10/1998 | Campana, Jr. et al. |
| 5,819,274 A | 10/1998 | Jackson, Jr. |
| 5,819,284 A | 10/1998 | Farber et al. |
| 5,822,324 A | 10/1998 | Kostresti et al. |
| 5,822,747 A | 10/1998 | Graefe et al. |
| 5,826,269 A | 10/1998 | Hussey |
| 5,831,664 A | 11/1998 | Wharton et al. |
| 5,832,483 A | 11/1998 | Barker |
| 5,832,489 A | 11/1998 | Kucala |
| 5,832,500 A | 11/1998 | Burrows |
| 5,835,722 A | 11/1998 | Bradshaw et al. |
| 5,838,252 A | 11/1998 | Kikinis |
| 5,838,768 A | 11/1998 | Sumar et al. |
| 5,838,973 A | 11/1998 | Carpenter-Smith et al. |
| 5,845,278 A | 12/1998 | Kirsch et al. |
| 5,852,775 A | 12/1998 | Hidary |
| 5,852,820 A | 12/1998 | Burrows |
| 5,857,201 A | 1/1999 | Wright, Jr. et al. |
| 5,862,223 A | 1/1999 | Walker et al. |
| 5,867,665 A | 2/1999 | Butman et al. |
| 5,867,817 A | 2/1999 | Catallo et al. |
| 5,870,759 A | 2/1999 | Bauer et al. |
| 5,884,323 A | 3/1999 | Hawkins et al. |
| 5,889,845 A | 3/1999 | Staples et al. |
| 5,890,147 A | 3/1999 | Peltonen et al. |
| 5,892,909 A | 4/1999 | Grasso et al. |
| 5,898,780 A | 4/1999 | Liu et al. |
| 5,898,917 A | 4/1999 | Batni et al. |
| 5,903,723 A | 5/1999 | Beck et al. |
| 5,907,618 A | 5/1999 | Gennaro et al. |
| 5,909,689 A | 6/1999 | Van Ryzin |
| 5,913,032 A | 6/1999 | Schwartz et al. |
| 5,924,096 A | 7/1999 | Draper et al. |
| 5,928,325 A | 7/1999 | Shaughnessy et al. |
| 5,928,329 A | 7/1999 | Clark et al. |
| 5,937,161 A | 8/1999 | Mulligan et al. |
| 5,943,676 A | 8/1999 | Boothby |
| 5,948,066 A | 9/1999 | Whalen et al. |
| 5,951,636 A | 9/1999 | Zerber |
| 5,960,394 A | 9/1999 | Gould et al. |
| 5,960,406 A | 9/1999 | Rasansky et al. |
| 5,961,590 A | 10/1999 | Mendez et al. |
| 5,963,642 A | 10/1999 | Goldstein |
| 5,964,833 A | 10/1999 | Kikinis |
| 5,968,131 A | 10/1999 | Mendez et al. |
| 5,974,238 A | 10/1999 | Chase, Jr. |
| 5,974,327 A | 10/1999 | Agrawal et al. |
| 5,978,837 A | 11/1999 | Foladare et al. |
| 5,978,933 A | 11/1999 | Wyld et al. |
| 5,987,440 A | 11/1999 | O'Neil et al. |
| 6,000,000 A | 12/1999 | Hawkins et al. |
| 6,003,070 A | 12/1999 | Frantz |
| 6,006,274 A | 12/1999 | Hawkins et al. |
| 6,016,478 A | 1/2000 | Zhang et al. |
| 6,016,520 A | 1/2000 | Facq et al. |
| 6,018,762 A | 1/2000 | Brunson et al. |
| 6,023,700 A | 2/2000 | Owens et al. |
| 6,023,708 A | 2/2000 | Mendez et al. |
| 6,029,238 A | 2/2000 | Furukawa |
| 6,034,621 A | 3/2000 | Kaufman |
| 6,035,104 A | 3/2000 | Zahariev |
| 6,044,372 A | 3/2000 | Rothfus et al. |
| 6,044,381 A | 3/2000 | Boothby et al. |
| 6,047,051 A * | 4/2000 | Ginzboorg et al. ........... 379/130 |
| 6,047,327 A | 4/2000 | Tso et al. |
| 6,052,563 A | 4/2000 | Macko |
| 6,052,735 A | 4/2000 | Ulrich et al. |
| 6,057,855 A | 5/2000 | Barkans |
| 6,065,055 A | 5/2000 | Hughes et al. |
| 6,073,138 A | 6/2000 | de l'Etraz et al. |
| 6,073,142 A | 6/2000 | Geiger et al. |
| 6,073,165 A | 6/2000 | Narasimhan et al. |
| 6,085,166 A | 7/2000 | Beckhardt et al. |
| 6,085,192 A | 7/2000 | Mendez et al. |
| 6,088,677 A | 7/2000 | Spurgeon |
| 6,101,320 A | 8/2000 | Schuetze et al. |

| Patent No. | Kind | Date | Inventors |
|---|---|---|---|
| 6,101,480 | A | 8/2000 | Conmy et al. |
| 6,101,531 | A | 8/2000 | Eggleston et al. |
| 6,112,181 | A | 8/2000 | Shear et al. |
| 6,119,014 | A | 9/2000 | Alperovich et al. |
| 6,119,171 | A | 9/2000 | Alkhatib |
| 6,125,369 | A | 9/2000 | Wu et al. |
| 6,125,388 | A | 9/2000 | Reisman |
| 6,128,627 | A | 10/2000 | Mattis et al. |
| 6,130,898 | A | 10/2000 | Kostreski et al. |
| 6,131,096 | A | 10/2000 | Ng et al. |
| 6,131,116 | A | 10/2000 | Riggins et al. |
| 6,134,432 | A | 10/2000 | Holmes et al. |
| 6,138,013 | A | 10/2000 | Blanchard et al. |
| 6,138,124 | A | 10/2000 | Beckhardt |
| 6,138,128 | A | 10/2000 | Perkowitz et al. |
| 6,138,146 | A | 10/2000 | Moon et al. |
| 6,141,664 | A | 10/2000 | Boothby |
| 6,151,606 | A | 11/2000 | Mendez |
| 6,157,630 | A | 12/2000 | Adler et al. |
| 6,161,140 | A | 12/2000 | Moriya |
| 6,167,379 | A | 12/2000 | Dean et al. |
| 6,167,435 | A | 12/2000 | Druckenmiller et al. |
| 6,170,014 | B1 | 1/2001 | Darago et al. |
| 6,173,312 | B1 | 1/2001 | Atarashi et al. |
| 6,173,446 | B1 | 1/2001 | Khan et al. |
| 6,175,831 | B1 | 1/2001 | Weinreich et al. |
| 6,178,419 | B1 | 1/2001 | Legh-Smith et al. |
| 6,181,935 | B1 | 1/2001 | Gossman et al. |
| 6,195,533 | B1 | 2/2001 | Tkatch et al. |
| 6,198,696 | B1 | 3/2001 | Korpi et al. |
| 6,198,922 | B1 * | 3/2001 | Baynham ............... 455/429 |
| 6,201,469 | B1 | 3/2001 | Balch et al. |
| 6,202,085 | B1 | 3/2001 | Benson et al. |
| 6,205,448 | B1 | 3/2001 | Kruglikov et al. |
| 6,212,529 | B1 | 4/2001 | Boothby et al. |
| 6,219,694 | B1 | 4/2001 | Lazaridis et al. |
| 6,221,877 | B1 | 4/2001 | Aronov et al. |
| 6,223,187 | B1 | 4/2001 | Boothby et al. |
| 6,226,686 | B1 | 5/2001 | Rothschild et al. |
| 6,233,341 | B1 | 5/2001 | Riggins |
| 6,243,705 | B1 | 6/2001 | Kucala |
| 6,246,875 | B1 | 6/2001 | Seazholtz et al. |
| 6,247,135 | B1 | 6/2001 | Feague |
| 6,249,808 | B1 | 6/2001 | Seshadri |
| 6,256,666 | B1 | 7/2001 | Singhal |
| 6,263,201 | B1 | 7/2001 | Hashimoto et al. |
| 6,263,340 | B1 | 7/2001 | Green |
| 6,269,369 | B1 | 7/2001 | Robertson |
| 6,272,545 | B1 | 8/2001 | Flanagin et al. |
| 6,275,850 | B1 | 8/2001 | Beyda et al. |
| 6,289,212 | B1 | 9/2001 | Stein et al. |
| 6,292,904 | B1 | 9/2001 | Broomhall et al. |
| 6,295,541 | B1 | 9/2001 | Bodnar et al. |
| 6,300,947 | B1 | 10/2001 | Kanevsky |
| 6,304,881 | B1 | 10/2001 | Halim et al. |
| 6,308,201 | B1 | 10/2001 | Pivowar et al. |
| 6,317,594 | B1 | 11/2001 | Gossman et al. |
| 6,320,943 | B1 | 11/2001 | Borland |
| 6,324,541 | B1 | 11/2001 | de l'Etraz et al. |
| 6,324,542 | B1 | 11/2001 | Wright, Jr. et al. |
| 6,324,544 | B1 | 11/2001 | Alam et al. |
| 6,324,587 | B1 | 11/2001 | Trenbeath et al. |
| 6,327,586 | B1 | 12/2001 | Kisiel |
| 6,336,117 | B1 | 1/2002 | Massarani |
| 6,356,937 | B1 | 3/2002 | Montville et al. |
| 6,363,352 | B1 | 3/2002 | Dailey et al. |
| 6,370,566 | B2 | 4/2002 | Discolo et al. |
| 6,377,810 | B1 | 4/2002 | Geiger et al. |
| 6,380,959 | B1 | 4/2002 | Wang et al. |
| 6,389,455 | B1 | 5/2002 | Fuisz |
| 6,389,457 | B2 | 5/2002 | Lazaridis et al. |
| 6,397,057 | B1 | 5/2002 | Malackowski et al. |
| 6,397,230 | B1 | 5/2002 | Carmel et al. |
| 6,401,104 | B1 | 6/2002 | LaRue et al. |
| 6,401,112 | B1 | 6/2002 | Boyer et al. |
| 6,401,113 | B2 | 6/2002 | Lazaridis et al. |
| 6,405,197 | B2 | 6/2002 | Gilmour |
| 6,411,696 | B1 | 6/2002 | Iverson et al. |
| 6,415,031 | B1 | 7/2002 | Colligan et al. |
| 6,418,308 | B1 | 7/2002 | Heinonen et al. |
| 6,421,669 | B1 | 7/2002 | Gilmour et al. |
| 6,421,781 | B1 | 7/2002 | Fox et al. |
| 6,430,602 | B1 | 8/2002 | Kay et al. |
| 6,438,585 | B2 | 8/2002 | Mousseau et al. |
| 6,438,612 | B1 | 8/2002 | Ylonen et al. |
| 6,442,589 | B1 | 8/2002 | Takahashi et al. |
| 6,442,637 | B1 | 8/2002 | Hawkins et al. |
| 6,446,118 | B1 | 9/2002 | Gottlieb |
| 6,463,463 | B1 | 10/2002 | Godfrey et al. |
| 6,463,464 | B1 | 10/2002 | Lazaridis et al. |
| 6,487,557 | B1 | 11/2002 | Nagatomo |
| 6,487,560 | B1 | 11/2002 | LaRue et al. |
| 6,490,353 | B1 | 12/2002 | Tan |
| 6,496,802 | B1 | 12/2002 | van Zoest et al. |
| 6,499,054 | B1 | 12/2002 | Hesselink et al. |
| 6,505,214 | B1 | 1/2003 | Sherman et al. |
| 6,516,327 | B1 | 2/2003 | Zondervan et al. |
| 6,526,506 | B1 | 2/2003 | Lewis |
| 6,529,908 | B1 | 3/2003 | Piett et al. |
| 6,532,446 | B1 | 3/2003 | King |
| 6,535,892 | B1 | 3/2003 | LaRue et al. |
| 6,546,005 | B1 | 4/2003 | Berkley et al. |
| 6,549,939 | B1 | 4/2003 | Ford et al. |
| 6,556,217 | B1 | 4/2003 | Mäkipääää et al. |
| 6,593,944 | B1 | 7/2003 | Nicolas et al. |
| 6,601,026 | B2 | 7/2003 | Appelt et al. |
| 6,615,253 | B1 | 9/2003 | Bowman-Amuah |
| 6,618,710 | B1 | 9/2003 | Zondervan et al. |
| 6,625,621 | B2 | 9/2003 | Tan et al. |
| 6,636,482 | B2 | 10/2003 | Cloonan et al. |
| 6,639,693 | B1 | 10/2003 | Ejiri et al. |
| 6,640,097 | B2 | 10/2003 | Corrigan et al. |
| 6,640,244 | B1 | 10/2003 | Bowman-Amuah |
| 6,640,249 | B1 | 10/2003 | Bowman-Amuah |
| 6,643,650 | B1 | 11/2003 | Slaughter et al. |
| 6,643,688 | B1 | 11/2003 | Fuisz |
| 6,647,384 | B2 | 11/2003 | Gilmour |
| 6,650,890 | B1 | 11/2003 | Irlam et al. |
| 6,662,016 | B1 | 12/2003 | Buckham et al. |
| 6,668,046 | B1 * | 12/2003 | Albal ..................... 379/119 |
| 6,671,695 | B2 | 12/2003 | McFadden |
| 6,671,700 | B1 | 12/2003 | Creemer et al. |
| 6,671,702 | B2 | 12/2003 | Kruglikov et al. |
| 6,671,757 | B1 | 12/2003 | Multer et al. |
| 6,694,336 | B1 | 2/2004 | Multer et al. |
| 6,697,807 | B2 | 2/2004 | McGeachie |
| 6,701,378 | B1 | 3/2004 | Gilhuly et al. |
| 6,707,801 | B2 | 3/2004 | Hsu |
| 6,708,221 | B1 | 3/2004 | Mendez et al. |
| 6,714,965 | B2 | 3/2004 | Kakuta et al. |
| 6,721,787 | B1 | 4/2004 | Hiscock |
| 6,727,917 | B1 | 4/2004 | Chew et al. |
| 6,728,530 | B1 | 4/2004 | Heinonen et al. |
| 6,728,786 | B2 | 4/2004 | Hawkins et al. |
| 6,732,101 | B1 | 5/2004 | Cook |
| 6,732,158 | B1 | 5/2004 | Hesselink et al. |
| 6,735,591 | B2 | 5/2004 | Khan |
| 6,741,232 | B1 | 5/2004 | Siedlikowski et al. |
| 6,741,855 | B1 | 5/2004 | Martin et al. |
| 6,742,015 | B1 | 5/2004 | Bowman-Amuah |
| 6,745,024 | B1 | 6/2004 | DeJaco et al. |
| 6,745,326 | B1 | 6/2004 | Wary |
| 6,756,882 | B2 | 6/2004 | Benes et al. |
| 6,757,362 | B1 | 6/2004 | Cooper et al. |
| 6,757,696 | B2 | 6/2004 | Multer et al. |
| 6,760,916 | B2 | 7/2004 | Holtz et al. |
| 6,771,294 | B1 | 8/2004 | Pulli et al. |
| 6,775,362 | B1 | 8/2004 | Ransom |
| 6,779,019 | B1 | 8/2004 | Mousseau et al. |
| 6,782,409 | B1 | 8/2004 | Yoshida |
| 6,785,868 | B1 | 8/2004 | Raff |
| 6,785,906 | B1 | 8/2004 | Gaughan et al. |
| 6,799,190 | B1 | 9/2004 | Boothby |
| 6,804,707 | B1 | 10/2004 | Ronning |
| 6,816,849 | B1 | 11/2004 | Halt, Jr. |
| 6,820,088 | B1 | 11/2004 | Hind et al. |
| 6,820,204 | B1 | 11/2004 | Desai et al. |
| 6,829,487 | B2 | 12/2004 | Eiden et al. |

| | | |
|---|---|---|
| 6,834,195 B2 | 12/2004 | Brandenberg et al. |
| 6,847,974 B2 | 1/2005 | Wachtel |
| 6,850,757 B2 | 2/2005 | Watanabe et al. |
| 6,859,212 B2 | 2/2005 | Kumar et al. |
| 6,867,774 B1 | 3/2005 | Halmshaw et al. |
| 6,868,447 B1 | 3/2005 | Slaughter et al. |
| 6,871,220 B1 | 3/2005 | Rajan et al. |
| 6,873,688 B1 | 3/2005 | Aarnio |
| 6,879,985 B2 | 4/2005 | Deguchi et al. |
| 6,886,030 B1 | 4/2005 | Easterbrook et al. |
| 6,892,070 B2 | 5/2005 | Warrier et al. |
| 6,892,196 B1 | 5/2005 | Hughes |
| 6,895,394 B1 | 5/2005 | Kremer et al. |
| 6,895,558 B1 | 5/2005 | Loveland |
| 6,898,427 B1 | 5/2005 | Griffith et al. |
| 6,922,547 B2 | 7/2005 | O'Neill et al. |
| 6,922,721 B1 | 7/2005 | Minborg et al. |
| 6,925,477 B1 | 8/2005 | Champagne et al. |
| 6,931,529 B2 | 8/2005 | Kunzinger |
| 6,938,079 B1 | 8/2005 | Anderson et al. |
| 6,944,447 B2 | 9/2005 | Portman et al. |
| 6,944,662 B2 | 9/2005 | Devine et al. |
| 6,947,770 B2 | 9/2005 | Rydbeck |
| 6,957,397 B1 | 10/2005 | Hawkins et al. |
| 6,965,917 B1 | 11/2005 | Aloni et al. |
| 6,966,058 B2 | 11/2005 | Earl et al. |
| 6,968,175 B2 | 11/2005 | Raivisto et al. |
| 6,970,879 B1 | 11/2005 | Gilmour |
| 6,972,682 B2 | 12/2005 | Lareau et al. |
| 6,973,299 B2 | 12/2005 | Apfel |
| 6,981,047 B2 | 12/2005 | Hanson et al. |
| 6,986,061 B1 | 1/2006 | Kunzinger |
| 6,987,734 B2 | 1/2006 | Hundemer |
| 6,990,472 B2 | 1/2006 | Rosenhaft et al. |
| 6,993,326 B2 | 1/2006 | Link, II et al. |
| 6,993,327 B2 | 1/2006 | Mathis |
| 6,999,753 B2 | 2/2006 | Beckmann et al. |
| 7,026,984 B1 | 4/2006 | Thandu et al. |
| 7,032,242 B1 | 4/2006 | Grabelsky et al. |
| 7,035,630 B2 | 4/2006 | Knowles |
| 7,046,993 B2 | 5/2006 | Haaramo et al. |
| 7,047,202 B2 | 5/2006 | Jaipuria et al. |
| 7,062,024 B2 * | 6/2006 | Kreckel et al. ............... 379/126 |
| 7,069,308 B2 | 6/2006 | Abrams |
| 7,072,678 B2 | 7/2006 | Allison |
| 7,079,499 B1 | 7/2006 | Akhtar et al. |
| 7,082,316 B2 | 7/2006 | Eiden et al. |
| 7,085,365 B2 | 8/2006 | Kauppinen |
| 7,096,030 B2 | 8/2006 | Huomo |
| 7,100,821 B2 | 9/2006 | Rasti |
| 7,103,432 B2 | 9/2006 | Drader et al. |
| 7,120,692 B2 | 10/2006 | Hesselink et al. |
| 7,120,928 B2 | 10/2006 | Sheth et al. |
| 7,130,839 B2 | 10/2006 | Boreham et al. |
| 7,136,645 B2 | 11/2006 | Hanson et al. |
| 7,139,555 B2 | 11/2006 | Apfel |
| 7,139,565 B2 | 11/2006 | Fiatal et al. |
| 7,140,549 B2 | 11/2006 | de Jong |
| 7,146,645 B1 | 12/2006 | Hellsten et al. |
| 7,149,780 B2 | 12/2006 | Quine et al. |
| 7,149,789 B2 | 12/2006 | Slivka et al. |
| 7,149,959 B1 | 12/2006 | Jones et al. |
| 7,162,241 B2 | 1/2007 | Kim et al. |
| 7,165,727 B2 | 1/2007 | de Jong |
| 7,172,118 B2 | 2/2007 | Urken |
| 7,181,228 B2 | 2/2007 | Boesch |
| 7,184,790 B2 | 2/2007 | Dorenbosch et al. |
| 7,194,273 B2 | 3/2007 | Vaudreuil |
| 7,200,390 B1 | 4/2007 | Henager et al. |
| 7,206,806 B2 | 4/2007 | Pineau |
| 7,209,757 B2 | 4/2007 | Naghian et al. |
| 7,219,222 B1 | 5/2007 | Durbin et al. |
| 7,224,957 B2 | 5/2007 | Spector |
| 7,231,206 B2 | 6/2007 | Cudak et al. |
| 7,233,795 B1 | 6/2007 | Ryden |
| 7,234,111 B2 | 6/2007 | Chu et al. |
| 7,239,877 B2 | 7/2007 | Corneille et al. |
| 7,240,095 B1 | 7/2007 | Lewis |
| 7,242,680 B2 | 7/2007 | Gallant |
| 7,245,926 B2 | 7/2007 | Liao et al. |
| 7,257,391 B2 | 8/2007 | Burgess et al. |
| 7,259,666 B1 | 8/2007 | Hermsmeyer et al. |
| 7,260,552 B2 | 8/2007 | Riera Jorba et al. |
| 7,260,590 B1 | 8/2007 | Williams |
| 7,272,830 B2 | 9/2007 | de Jong |
| 7,277,408 B2 | 10/2007 | Sorsa |
| 7,289,792 B1 | 10/2007 | Turunen |
| 7,289,964 B1 | 10/2007 | Bowman-Amuah |
| 7,289,971 B1 | 10/2007 | O'Neil et al. |
| 7,293,107 B1 | 11/2007 | Hanson et al. |
| 7,295,853 B2 | 11/2007 | Jin et al. |
| 7,305,700 B2 | 12/2007 | Boynton et al. |
| 7,310,350 B1 | 12/2007 | Shao et al. |
| 7,310,729 B2 | 12/2007 | Gordon et al. |
| 7,349,871 B2 | 3/2008 | Labrou et al. |
| 7,359,720 B2 | 4/2008 | Hartmaier et al. |
| 7,373,386 B2 | 5/2008 | Gardner et al. |
| 7,374,099 B2 | 5/2008 | de Jong |
| 7,376,701 B2 | 5/2008 | Bhargava et al. |
| 7,382,879 B1 | 6/2008 | Miller |
| 7,388,950 B2 | 6/2008 | Elsey et al. |
| 7,389,412 B2 | 6/2008 | Sharma et al. |
| 7,392,483 B2 | 6/2008 | Wong et al. |
| 7,395,329 B1 | 7/2008 | Holt et al. |
| 7,430,609 B2 | 9/2008 | Brown et al. |
| 7,441,271 B2 | 10/2008 | Fiatal et al. |
| 7,461,071 B2 | 12/2008 | Fitzpatrick et al. |
| 7,465,231 B2 | 12/2008 | Lewin et al. |
| 7,469,125 B2 | 12/2008 | Nurmi |
| 7,483,036 B2 | 1/2009 | Moore |
| 7,499,573 B2 | 3/2009 | Tanabata et al. |
| 7,502,615 B2 | 3/2009 | Wilhoite et al. |
| 7,519,042 B2 | 4/2009 | Gorday et al. |
| 7,532,571 B1 | 5/2009 | Price et al. |
| 7,539,665 B2 | 5/2009 | Mendez |
| 7,567,575 B2 | 7/2009 | Chen et al. |
| 7,574,208 B2 | 8/2009 | Hanson et al. |
| 7,575,171 B2 | 8/2009 | Lev |
| 7,587,482 B2 | 9/2009 | Henderson et al. |
| 7,596,608 B2 | 9/2009 | Alexander et al. |
| 7,643,818 B2 | 1/2010 | Backholm et al. |
| 7,680,281 B2 | 3/2010 | Fiatal et al. |
| 7,689,664 B2 | 3/2010 | Karlberg |
| 7,706,781 B2 | 4/2010 | Backholm et al. |
| 7,752,633 B1 | 7/2010 | Fleming |
| 7,769,395 B2 | 8/2010 | Fiatal et al. |
| 7,769,400 B2 | 8/2010 | Backholm et al. |
| 7,796,742 B1 | 9/2010 | Sutaria et al. |
| 7,797,064 B2 | 9/2010 | Loomis et al. |
| 7,827,597 B2 | 11/2010 | Boynton et al. |
| 7,853,563 B2 | 12/2010 | Alvarado et al. |
| 7,877,703 B1 | 1/2011 | Fleming |
| 7,917,505 B2 | 3/2011 | Gent et al. |
| 2001/0010046 A1 | 7/2001 | Muyres et al. |
| 2001/0023414 A1 | 9/2001 | Kumar et al. |
| 2001/0032254 A1 | 10/2001 | Hawkins et al. |
| 2001/0034225 A1 | 10/2001 | Gupte et al. |
| 2001/0034244 A1 | 10/2001 | Calder et al. |
| 2001/0037453 A1 | 11/2001 | Mitty et al. |
| 2001/0039191 A1 | 11/2001 | Maierhofer |
| 2001/0041566 A1 | 11/2001 | Xanthos et al. |
| 2001/0042009 A1 | 11/2001 | Montague |
| 2001/0042099 A1 | 11/2001 | Peng |
| 2001/0043148 A1 | 11/2001 | Stewart |
| 2002/0002478 A1 | 1/2002 | Swart et al. |
| 2002/0007303 A1 | 1/2002 | Brookler et al. |
| 2002/0013727 A1 | 1/2002 | Lee |
| 2002/0019225 A1 | 2/2002 | Miyashita |
| 2002/0019812 A1 | 2/2002 | Board et al. |
| 2002/0035556 A1 | 3/2002 | Shah et al. |
| 2002/0035617 A1 | 3/2002 | Lynch et al. |
| 2002/0038253 A1 | 3/2002 | Seaman et al. |
| 2002/0042875 A1 | 4/2002 | Shukla |
| 2002/0049828 A1 | 4/2002 | Pekarek-Kostka |
| 2002/0053078 A1 | 5/2002 | Holtz et al. |
| 2002/0055351 A1 | 5/2002 | Elsey et al. |
| 2002/0059201 A1 | 5/2002 | Work |
| 2002/0059457 A1 | 5/2002 | Ballard et al. |

| | | |
|---|---|---|
| 2002/0068559 A1 | 6/2002 | Sharma et al. |
| 2002/0077077 A1 | 6/2002 | Rezvani et al. |
| 2002/0077084 A1 | 6/2002 | Zellner et al. |
| 2002/0078384 A1 | 6/2002 | Hippelainen |
| 2002/0087679 A1 | 7/2002 | Pulley et al. |
| 2002/0089542 A1 | 7/2002 | Imamura |
| 2002/0091921 A1 | 7/2002 | Kunzinger |
| 2002/0095319 A1 | 7/2002 | Swart et al. |
| 2002/0095328 A1 | 7/2002 | Swart et al. |
| 2002/0095391 A1 | 7/2002 | Swart et al. |
| 2002/0095399 A1 | 7/2002 | Devine et al. |
| 2002/0098855 A1 | 7/2002 | Hartmaier et al. |
| 2002/0099613 A1 | 7/2002 | Swart et al. |
| 2002/0101975 A1 | 8/2002 | Tiburtius et al. |
| 2002/0116499 A1 | 8/2002 | Ennus et al. |
| 2002/0116501 A1 | 8/2002 | Ho et al. |
| 2002/0120766 A1 | 8/2002 | Okajima et al. |
| 2002/0120779 A1 | 8/2002 | Teeple et al. |
| 2002/0126701 A1 | 9/2002 | Requena |
| 2002/0133504 A1 | 9/2002 | Vlahos et al. |
| 2002/0144109 A1 | 10/2002 | Benantar et al. |
| 2002/0146129 A1 | 10/2002 | Kaplan |
| 2002/0152379 A1 | 10/2002 | Gefwert et al. |
| 2002/0155848 A1 | 10/2002 | Suryanarayana |
| 2002/0158908 A1 | 10/2002 | Vaajala et al. |
| 2002/0161587 A1 | 10/2002 | Pitts, III et al. |
| 2002/0161925 A1 | 10/2002 | Munger et al. |
| 2002/0161928 A1 | 10/2002 | Ndili |
| 2002/5016192 | 10/2002 | Munger et al. |
| 2002/0164977 A1 | 11/2002 | Link II et al. |
| 2002/0186848 A1 | 12/2002 | Shaik |
| 2002/0188940 A1 | 12/2002 | Breckner et al. |
| 2002/0193094 A1 | 12/2002 | Lawless et al. |
| 2002/0194209 A1 | 12/2002 | Bolosky et al. |
| 2002/0198027 A1 | 12/2002 | Rydbeck |
| 2003/0005151 A1 | 1/2003 | Ullman et al. |
| 2003/0022662 A1 | 1/2003 | Mittal |
| 2003/0023975 A1 | 1/2003 | Schrader et al. |
| 2003/0028430 A1 | 2/2003 | Zimmerman |
| 2003/0028441 A1 | 2/2003 | Barsness et al. |
| 2003/0054810 A1 | 3/2003 | Chen et al. |
| 2003/0056096 A1 | 3/2003 | Albert et al. |
| 2003/0060188 A1 | 3/2003 | Gidron et al. |
| 2003/0063120 A1 | 4/2003 | Wong et al. |
| 2003/0065738 A1 | 4/2003 | Yang et al. |
| 2003/0065802 A1 | 4/2003 | Vitikainen et al. |
| 2003/0070061 A1 | 4/2003 | Wong et al. |
| 2003/0072451 A1 | 4/2003 | Pimentel et al. |
| 2003/0078880 A1 | 4/2003 | Alley et al. |
| 2003/0084165 A1 | 5/2003 | Kjellberg et al. |
| 2003/0088629 A1 | 5/2003 | Berkowitz et al. |
| 2003/0093691 A1 | 5/2003 | Simon et al. |
| 2003/0097381 A1 | 5/2003 | Detweiler et al. |
| 2003/0100321 A1 | 5/2003 | Rao et al. |
| 2003/0100326 A1 | 5/2003 | Grube et al. |
| 2003/0117432 A1 | 6/2003 | Kautto-Kiovula et al. |
| 2003/0125023 A1 | 7/2003 | Fishler |
| 2003/0126216 A1 | 7/2003 | Avila et al. |
| 2003/0130984 A1 | 7/2003 | Quinlan et al. |
| 2003/0146934 A1 | 8/2003 | Bailey et al. |
| 2003/0153338 A1 | 8/2003 | Herz et al. |
| 2003/0154212 A1 | 8/2003 | Schirmer et al. |
| 2003/0156146 A1 | 8/2003 | Suomela et al. |
| 2003/0157947 A1* | 8/2003 | Fiatal et al. .................. 455/466 |
| 2003/0169262 A1 | 9/2003 | Lavelle et al. |
| 2003/0177281 A1* | 9/2003 | McQuillan et al. ........... 709/320 |
| 2003/0208529 A1 | 11/2003 | Pendyala et al. |
| 2003/0208559 A1 | 11/2003 | Velline et al. |
| 2003/0211845 A1 | 11/2003 | Lohtia et al. |
| 2003/0217098 A1 | 11/2003 | Bobde et al. |
| 2003/0217142 A1 | 11/2003 | Bobde et al. |
| 2003/0223554 A1 | 12/2003 | Zhang |
| 2003/0227745 A1 | 12/2003 | Khoo |
| 2003/0235308 A1 | 12/2003 | Boynton et al. |
| 2003/0236981 A1 | 12/2003 | Marmigere et al. |
| 2004/0002324 A1 | 1/2004 | Juntunen et al. |
| 2004/0006630 A1 | 1/2004 | Friend et al. |
| 2004/0024795 A1 | 2/2004 | Hind et al. |
| 2004/0024892 A1 | 2/2004 | Creswell et al. |
| 2004/0027326 A1 | 2/2004 | Hays et al. |
| 2004/0027375 A1 | 2/2004 | Ellis et al. |
| 2004/0027378 A1 | 2/2004 | Hays et al. |
| 2004/0043770 A1 | 3/2004 | Amit et al. |
| 2004/0049599 A1 | 3/2004 | Friend et al. |
| 2004/0051715 A1 | 3/2004 | Brokenshire et al. |
| 2004/0054739 A1 | 3/2004 | Friend et al. |
| 2004/0064445 A1 | 4/2004 | Pfleging et al. |
| 2004/0064488 A1 | 4/2004 | Sinha |
| 2004/0068698 A1 | 4/2004 | Wu et al. |
| 2004/0075675 A1 | 4/2004 | Raivisto et al. |
| 2004/0075695 A1 | 4/2004 | Chew et al. |
| 2004/0078814 A1 | 4/2004 | Allen |
| 2004/0080515 A1 | 4/2004 | Hagiwara |
| 2004/0082346 A1 | 4/2004 | Skytt et al. |
| 2004/0098625 A1 | 5/2004 | Lagadec et al. |
| 2004/0103147 A1 | 5/2004 | Flesher et al. |
| 2004/0120323 A1 | 6/2004 | Viikari et al. |
| 2004/0128375 A1 | 7/2004 | Rockwell |
| 2004/0133626 A1 | 7/2004 | Herrero et al. |
| 2004/0141011 A1 | 7/2004 | Smethers et al. |
| 2004/0147262 A1 | 7/2004 | Lescuyer et al. |
| 2004/0158611 A1 | 8/2004 | Daniell et al. |
| 2004/0167966 A1 | 8/2004 | Lee et al. |
| 2004/0170257 A1 | 9/2004 | Gross et al. |
| 2004/0172481 A1 | 9/2004 | Engstrom |
| 2004/0176128 A1 | 9/2004 | Grabelsky et al. |
| 2004/0179513 A1 | 9/2004 | Smith et al. |
| 2004/0181550 A1 | 9/2004 | Warsta et al. |
| 2004/0186902 A1 | 9/2004 | Stewart |
| 2004/0189610 A1 | 9/2004 | Friend |
| 2004/0199497 A1 | 10/2004 | Timmons |
| 2004/0199582 A1 | 10/2004 | Kucharewski et al. |
| 2004/0205248 A1 | 10/2004 | Little et al. |
| 2004/0205330 A1 | 10/2004 | Godfrey et al. |
| 2004/0209602 A1 | 10/2004 | Joyce et al. |
| 2004/0230619 A1 | 11/2004 | Blanco et al. |
| 2004/0236792 A1 | 11/2004 | Celik |
| 2004/0252816 A1 | 12/2004 | Nicolas |
| 2004/0255126 A1 | 12/2004 | Reith |
| 2004/0258231 A1 | 12/2004 | Elsey et al. |
| 2004/0259535 A1 | 12/2004 | Elsey et al. |
| 2004/0266364 A1 | 12/2004 | Nguyen et al. |
| 2004/0268148 A1 | 12/2004 | Karjala et al. |
| 2005/0002501 A1 | 1/2005 | Elsey et al. |
| 2005/0002508 A1 | 1/2005 | Elsey et al. |
| 2005/0002509 A1 | 1/2005 | Elsey et al. |
| 2005/0002510 A1 | 1/2005 | Elsey et al. |
| 2005/0010694 A1 | 1/2005 | Ma et al. |
| 2005/0015432 A1 | 1/2005 | Cohen |
| 2005/0021750 A1 | 1/2005 | Abrams |
| 2005/0022182 A1 | 1/2005 | Mittal |
| 2005/0027591 A9 | 2/2005 | Gailey et al. |
| 2005/0027716 A1 | 2/2005 | Apfel |
| 2005/0033812 A1 | 2/2005 | McCarthy et al. |
| 2005/0038707 A1 | 2/2005 | Roever et al. |
| 2005/0038724 A1 | 2/2005 | Roever et al. |
| 2005/0038863 A1 | 2/2005 | Onyon et al. |
| 2005/0041793 A1 | 2/2005 | Fulton et al. |
| 2005/0044144 A1 | 2/2005 | Malik et al. |
| 2005/0055578 A1 | 3/2005 | Wright et al. |
| 2005/0063544 A1 | 3/2005 | Uusitalo et al. |
| 2005/0071674 A1 | 3/2005 | Chou et al. |
| 2005/0076136 A1 | 4/2005 | Cho et al. |
| 2005/0086540 A1 | 4/2005 | Gunter et al. |
| 2005/0094625 A1 | 5/2005 | Bouat |
| 2005/0097225 A1 | 5/2005 | Glatt et al. |
| 2005/0097570 A1 | 5/2005 | Bomers |
| 2005/0101307 A1 | 5/2005 | Brugge et al. |
| 2005/0102257 A1 | 5/2005 | Onyon et al. |
| 2005/0102328 A1 | 5/2005 | Ring et al. |
| 2005/0108427 A1 | 5/2005 | Datta |
| 2005/0117606 A1 | 6/2005 | Kim |
| 2005/0120082 A1 | 6/2005 | Hesselink et al. |
| 2005/0120084 A1 | 6/2005 | Hu et al. |
| 2005/0122333 A1 | 6/2005 | Sumanaweera et al. |
| 2005/0124332 A1 | 6/2005 | Clark et al. |
| 2005/0138111 A1 | 6/2005 | Aton et al. |
| 2005/0144219 A1 | 6/2005 | Terada |

| | | | | | | |
|---|---|---|---|---|---|---|
| 2005/0154796 A1 | 7/2005 | Forsyth | | 2007/0027917 A1 | 2/2007 | Ariel et al. |
| 2005/0155027 A1 | 7/2005 | Wei | | 2007/0027920 A1 | 2/2007 | Alvarado et al. |
| 2005/0164721 A1 | 7/2005 | Yeh et al. | | 2007/0027921 A1 | 2/2007 | Alvarado et al. |
| 2005/0183143 A1 | 8/2005 | Anderholm et al. | | 2007/0027930 A1 | 2/2007 | Alvarado et al. |
| 2005/0188038 A1 | 8/2005 | Yabe | | 2007/0033531 A1 | 2/2007 | Marsh |
| 2005/0193036 A1 | 9/2005 | Phillips et al. | | 2007/0038567 A1 | 2/2007 | Allaire et al. |
| 2005/0203966 A1 | 9/2005 | Labrou et al. | | 2007/0038931 A1 | 2/2007 | Allaire et al. |
| 2005/0210104 A1 | 9/2005 | Torvinen | | 2007/0044041 A1 | 2/2007 | Beynon et al. |
| 2005/0228812 A1 | 10/2005 | Hansmann et al. | | 2007/0049258 A1 | 3/2007 | Thibeault |
| 2005/0232295 A1 | 10/2005 | Young | | 2007/0060196 A1 | 3/2007 | Sharma |
| 2005/0234860 A1 | 10/2005 | Roever et al. | | 2007/0061393 A1 | 3/2007 | Moore |
| 2005/0235214 A1 | 10/2005 | Shimizu et al. | | 2007/0067381 A1 | 3/2007 | Grant et al. |
| 2005/0246139 A1 | 11/2005 | Roever et al. | | 2007/0067424 A1 | 3/2007 | Raciborski et al. |
| 2005/0248526 A1 | 11/2005 | Twerdahl et al. | | 2007/0078857 A1 | 4/2007 | Punaganti et al. |
| 2005/0251555 A1 | 11/2005 | Little, II | | 2007/0105627 A1 | 5/2007 | Campbell |
| 2005/0262220 A1 | 11/2005 | Ecklund et al. | | 2007/0116223 A1 | 5/2007 | Burke et al. |
| 2005/0273804 A1 | 12/2005 | Preisman | | 2007/0118620 A1 | 5/2007 | Cartmell et al. |
| 2005/0278307 A1 | 12/2005 | Battagin et al. | | 2007/0130108 A1 | 6/2007 | Simpson et al. |
| 2005/0278641 A1 | 12/2005 | Mansour et al. | | 2007/0130217 A1 | 6/2007 | Linyard et al. |
| 2005/0278647 A1 | 12/2005 | Leavitt et al. | | 2007/0156824 A1 | 7/2007 | Thompson |
| 2005/0288006 A1 | 12/2005 | Apfel | | 2007/0174433 A1 | 7/2007 | Mendez et al. |
| 2006/0020525 A1 | 1/2006 | Borelli et al. | | 2007/0175998 A1 | 8/2007 | Lev |
| 2006/0020580 A1 | 1/2006 | Dettinger et al. | | 2007/0198698 A1 | 8/2007 | Boyd et al. |
| 2006/0020804 A1 | 1/2006 | Schleifer et al. | | 2007/0220080 A1 | 9/2007 | Humphrey |
| 2006/0020947 A1 | 1/2006 | Hallamaa et al. | | 2007/0249365 A1 | 10/2007 | Jendbro |
| 2006/0021023 A1 | 1/2006 | Stewart et al. | | 2007/0250591 A1 | 10/2007 | Milic-Frayling et al. |
| 2006/0022048 A1 | 2/2006 | Johnson | | 2007/0264993 A1 | 11/2007 | Hughes |
| 2006/0026580 A1 | 2/2006 | Cabillic et al. | | 2007/0267492 A1 | 11/2007 | Maclaine Pont |
| 2006/0029062 A1 | 2/2006 | Rao et al. | | 2007/0276925 A1 | 11/2007 | LaJoie et al. |
| 2006/0029063 A1 | 2/2006 | Rao et al. | | 2007/0276926 A1 | 11/2007 | LaJoie et al. |
| 2006/0029064 A1 | 2/2006 | Rao et al. | | 2007/0290787 A1 | 12/2007 | Fiatal et al. |
| 2006/0031114 A1 | 2/2006 | Zommers | | 2007/0293207 A1 | 12/2007 | Guedalia et al. |
| 2006/0031365 A1 | 2/2006 | Kay et al. | | 2007/0293238 A1 | 12/2007 | Fiatal et al. |
| 2006/0031428 A1 | 2/2006 | Wikman | | 2008/0001717 A1 | 1/2008 | Fiatal |
| 2006/0031785 A1 | 2/2006 | Raciborski | | 2008/0009344 A1 | 1/2008 | Graham et al. |
| 2006/0037071 A1 | 2/2006 | Rao et al. | | 2008/0037787 A1 | 2/2008 | Boynton et al. |
| 2006/0046686 A1 | 3/2006 | Hawkins et al. | | 2008/0059308 A1 | 3/2008 | Gerken |
| 2006/0047844 A1 | 3/2006 | Deng | | 2008/0059398 A1 | 3/2008 | Tsutsui |
| 2006/0048061 A1 | 3/2006 | Forlenza et al. | | 2008/0061142 A1 | 3/2008 | Howcroft et al. |
| 2006/0052091 A1 | 3/2006 | Onyon et al. | | 2008/0077506 A1 | 3/2008 | Rampell et al. |
| 2006/0063544 A1 | 3/2006 | Zhao et al. | | 2008/0077571 A1 | 3/2008 | Harris et al. |
| 2006/0069686 A1 | 3/2006 | Beyda et al. | | 2008/0086379 A1 | 4/2008 | Dion et al. |
| 2006/0069687 A1 | 3/2006 | Cui et al. | | 2008/0103877 A1 | 5/2008 | Gerken |
| 2006/0073810 A1 | 4/2006 | Pyhalammi et al. | | 2008/0125225 A1 | 5/2008 | Lazaridis et al. |
| 2006/0074951 A1 | 4/2006 | Beier et al. | | 2008/0130663 A1 | 6/2008 | Fridman et al. |
| 2006/0085503 A1 | 4/2006 | Stoye et al. | | 2008/0133326 A1 | 6/2008 | Goncalves et al. |
| 2006/0093135 A1 | 5/2006 | Fiatal et al. | | 2008/0133641 A1 | 6/2008 | Gent et al. |
| 2006/0099969 A1 | 5/2006 | Staton et al. | | 2008/0133708 A1 | 6/2008 | Alvarado et al. |
| 2006/0132495 A1 | 6/2006 | Anderson | | 2008/0134292 A1 | 6/2008 | Ariel et al. |
| 2006/0141962 A1 | 6/2006 | Forbes et al. | | 2008/0140665 A1 | 6/2008 | Ariel et al. |
| 2006/0143464 A1 | 6/2006 | Ananthanarayanan et al. | | 2008/0151817 A1 | 6/2008 | Fitchett et al. |
| 2006/0149591 A1 | 7/2006 | Hauf et al. | | 2008/0154870 A1 | 6/2008 | Evermann et al. |
| 2006/0149843 A1 | 7/2006 | Rhoads et al. | | 2008/0155613 A1 | 6/2008 | Benya et al. |
| 2006/0149970 A1 | 7/2006 | Imazu | | 2008/0192820 A1 | 8/2008 | Brooks et al. |
| 2006/0165226 A1 | 7/2006 | Ernst et al. | | 2008/0201362 A1 | 8/2008 | Multer et al. |
| 2006/0168043 A1 | 7/2006 | Eisenberger et al. | | 2008/0201751 A1 | 8/2008 | Ahmed et al. |
| 2006/0168164 A1 | 7/2006 | Lemson | | 2008/0207182 A1 | 8/2008 | Maharajh et al. |
| 2006/0179410 A1 | 8/2006 | Deeds | | 2008/0209491 A1 | 8/2008 | Hasek |
| 2006/0188864 A1 | 8/2006 | Shah | | 2008/0270379 A1 | 10/2008 | Ramakrishna |
| 2006/0190428 A1 | 8/2006 | Jung et al. | | 2008/0298386 A1 | 12/2008 | Fiatal |
| 2006/0190984 A1 | 8/2006 | Heard et al. | | 2008/0313282 A1 | 12/2008 | Warila et al. |
| 2006/0192014 A1 | 8/2006 | Hamilton et al. | | 2009/0012841 A1 | 1/2009 | Saft et al. |
| 2006/0195570 A1 | 8/2006 | Zellner et al. | | 2009/0016526 A1 | 1/2009 | Fiatal et al. |
| 2006/0212531 A1 | 9/2006 | Kikkawa et al. | | 2009/0031006 A1 | 1/2009 | Johnson |
| 2006/0224629 A1 | 10/2006 | Alexander et al. | | 2009/0054034 A1 | 2/2009 | Backholm et al. |
| 2006/0230394 A1 | 10/2006 | Forth et al. | | 2009/0063647 A1 | 3/2009 | Backholm et al. |
| 2006/0240804 A1 | 10/2006 | Backholm et al. | | 2009/0075683 A1 | 3/2009 | Backholm et al. |
| 2006/0240805 A1 | 10/2006 | Backholm et al. | | 2009/0110179 A1 | 4/2009 | Elsey et al. |
| 2006/0242210 A1 | 10/2006 | Ring et al. | | 2009/0119266 A1 | 5/2009 | Fitzpatrick et al. |
| 2006/0242607 A1 | 10/2006 | Hudson | | 2009/0125523 A1 | 5/2009 | Fitzpatrick et al. |
| 2006/0252435 A1 | 11/2006 | Henderson et al. | | 2009/0144632 A1 | 6/2009 | Mendez |
| 2006/0265595 A1 | 11/2006 | Scottodiluzio | | 2009/0149203 A1 | 6/2009 | Backholm et al. |
| 2006/0277265 A1 | 12/2006 | Backholm et al. | | 2009/0156178 A1 | 6/2009 | Elsey et al. |
| 2006/0294071 A1 | 12/2006 | Weare et al. | | 2009/0157792 A1 | 6/2009 | Fiatal |
| 2007/0005738 A1 | 1/2007 | Alexion-Tiernan et al. | | 2009/0164560 A1 | 6/2009 | Fiatal |
| 2007/0022118 A1 | 1/2007 | Layne | | 2009/0172565 A1 | 7/2009 | Jackson et al. |
| 2007/0027775 A1 | 2/2007 | Hwang | | 2009/0181641 A1 | 7/2009 | Fiatal |
| 2007/0027832 A1 | 2/2007 | Fiatal et al. | | 2009/0182500 A1 | 7/2009 | Dicke |
| 2007/0027886 A1 | 2/2007 | Gent et al. | | 2009/0191903 A1 | 7/2009 | Fiatal |

| | | | |
|---|---|---|---|
| 2009/0193130 | A1 | 7/2009 | Fiatal |
| 2009/0193338 | A1 | 7/2009 | Fiatal |
| 2009/0221326 | A1 | 9/2009 | Roussel et al. |
| 2009/0241180 | A1 | 9/2009 | Fiatal |
| 2009/0248670 | A1 | 10/2009 | Fiatal |
| 2009/0248794 | A1 | 10/2009 | Helms et al. |
| 2009/0299817 | A1 | 12/2009 | Fok et al. |
| 2009/0307133 | A1 | 12/2009 | Holloway et al. |
| 2009/0318171 | A1 | 12/2009 | Backholm et al. |
| 2009/0323678 | A1 | 12/2009 | Wang |
| 2009/0325565 | A1 | 12/2009 | Backholm |
| 2010/0057924 | A1 | 3/2010 | Rauber et al. |
| 2010/0146107 | A1 | 6/2010 | Fiatal |
| 2010/0174735 | A1 | 7/2010 | Fiatal |

FOREIGN PATENT DOCUMENTS

| | | |
|---|---|---|
| EP | 1422899 A1 | 5/2004 |
| EP | 1466261 A1 | 10/2004 |
| EP | 1466435 A1 | 10/2004 |
| FI | 117152 B | 6/2006 |
| FI | 118288 B | 9/2007 |
| FI | 119581 B | 12/2008 |
| JP | 4-154233 | 5/1992 |
| JP | 10-336372 A | 12/1998 |
| JP | 2001-218185 | 10/2001 |
| JP | 2001-350718 A | 12/2001 |
| JP | 2001-356973 A | 12/2001 |
| JP | 2005-515664 T | 5/2005 |
| JP | 4386732 B2 | 10/2009 |
| WO | WO 97/41661 | 11/1997 |
| WO | WO 98/24257 | 6/1998 |
| WO | WO 98/58322 | 12/1998 |
| WO | WO 2001/030130 A2 | 5/2001 |
| WO | WO 2003/007570 A1 | 1/2003 |
| WO | WO 2003/058483 A1 | 7/2003 |
| WO | WO 2003/058879 A1 | 7/2003 |
| WO | WO 03/098890 | 11/2003 |
| WO | WO 2004/045171 | 5/2004 |
| WO | WO 2005/015925 A2 | 2/2005 |
| WO | WO 2005/020108 A1 | 3/2005 |
| WO | WO 2006/045005 A1 | 4/2006 |
| WO | WO 2006/045102 A2 | 4/2006 |
| WO | WO 2007/015725 A2 | 2/2007 |
| WO | WO 2007/015726 A1 | 2/2007 |
| WO | WO 2007/149526 A2 | 12/2007 |
| WO | WO 2007/149540 A2 | 12/2007 |

OTHER PUBLICATIONS

Lotus Development Corporation, *Lotus Notes Release 4 Install Guide for Servers*, 1995.
Lotus Development Corporation, *Lotus Notes Release 4.1 Release Notes*, 1995.
Lotus Development Corporation, *Lotus Notes Release 4 Migration Guide*, 1995.
Lotus Development Corporation, *Lotus Notes Release 4 Database Manager's Guide*, 1995.
Lotus Development Corporation, *Lotus Notes Release 4 Install Guide for Workstations*, 1995.
Lotus Development Corporation, *Lotus Step by Step: A Beginner's Guide to Lotus Notes*, 1995.
Lotus Development Corporation, *Lotus Notes Release 4 Programmer's Guide Part 1*, 1995.
Lotus Development Corporation, *Lotus Notes Release 4 Programmer's Guide Part 2*, 1995.
Lotus Development Corporation, *Lotus Notes Release 4 Administrator's Guide*, 1995.
Lotus Development Corporation, *Lotus Notes Release 4 Deployment Guide*, 1995.
Lotus Development Corporation, *Lotus Notes Release 4 Application Developer's Guide*, 1995.
Lotus Development Corporation, *Lotus Notes Release 4 InterNotes Web Navigator User's Guide*, 1995.
Lotus Development Corporation, *Lotus Notes Release 4 Release Notes*, 1995.
Lotus Development Corporation, Lotus Notes Release 4.5 Install Guide for Workstations, 1995.
Lotus Development Corporation, Release Notes, Lotus Notes Release 3.30, Windows, OS/2, and Macintosh, 1995.
Brown, Kevin, et al., Mastering Lotus® Notes®, SYBEX Inc., 1995.
Lotus Development Corporation, Lotus Notes Release 4.5, Network Configuration Guide, 1995.
Netscape Communications Corporation, Installation Guide, Netscape Mail Server, Version 2.0 for Unix, 1995.
Netscape Communications Corporation, User's Guide, Netscape Mail Server, Version 2.0, 1995.
Netscape Communications Corporation, Administrator's Guide, Netscape Mail Server, Version 2.0, 1995.
Pyle, Hugh, "The Architecture of Lotus Notes", Lotus Notes Advisor, Advisor Publications, Premiere Issue 1995, pp. 18-27.
*Lotus Notes Advisor*, Advisor Publications, Jun. 1995, entire magazine.
IBM, "The Architecture of Lotus Notes", White Paper, No. 114654, modified date: May 31, 1995.
Lotus Development Corporation, Lotus Notes Knowledge Base, "What is the Notes Replicator", Jul. 5, 1995.
*Lotus Notes Advisor*, Advisor Publications, Aug. 1995, entire magazine.
Grous, Paul J., "Creating an Managing a Web Site with Lotus' InterNotes Web Publisher", *The View Technical Journal for Lotus Notes® Software*, vol. 1, Issue 4, Sep./Oct. 1995, pp. 3-18.
*Lotus Notes Advisor*, Advisor Publications, Oct. 1995, entire magazine.
Cole, Barb, "Lotus airs Notes-to-database integration tool", www.looksmart.com, Oct. 2, 1995.
Lotus Development Corporation, Lotus Notes Knowledge Base, "Lotus Announces Lotus NotesPump 1.0", Oct. 31, 1995.
Lotus Development Corporation, Lotus Notes Knowledge Base, "Lotus NotesPump 1.0 Q & A", Oct. 31, 1995.
Lotus Development Corporation, Lotus Notes Knowledge Base, "Lotus NotesPump: Database Integration for Lotus Notes", Oct. 31, 1995.
Lotus Development Corporation, Lotus Notes Knowledge Base, "How to Set Up "Firewall" Protection for a Notes Domain", Nov. 6, 1995.
Balaban, Bob, "This is Not Your Father's Basic: LotusScript in Notes Release 4", *Lotus Notes Advisor*, Advisor Publications, vol. 1, No. 5, Nov./Dec. 1995, pp. 31-58.
Pyle, Lisa, "A Jump Start to the Top Ten R3-to-R4 Migration Considerations", *Lotus Notes Advisor*, Advisor Publications, vol. 1, No. 5, Nov./Dec. 1995, pp. 3-20.
*Lotus Notes Advisor*, Advisor Publications, Dec. 1995, entire magazine.
Lotus Development Corporation, *Lotus Notes Release 4 Install Guide for Workstations*, First Revision, 1996.
Lotus Development Corporation, *Lotus Step by Step: A Beginner's Guide to Lotus Notes*, First Revision, 1996.
Freeland, Pat and Londergan, Stephen, *Lotus Notes Release 4 for Dummies™*, IDG Books Worldwide, 1996.
Kreisle, Bill, *Teach yourself... Lotus Notes 4*, MIS:Press, 1996.
Marmel, Elain, *Easy Lotus® Notes Release 4.0*, Que Corporation, 1996.
Lotus Development Corporation, *Lotus Notes Server Up and Running!, Release 4*, 1996.
Falkner, Mike, "How to Plan, Develop, and Implement Lotus Notes in Your Organization", Wiley Computer Publishing, John Wiley and Sons, Inc., 1996.
Lamb, John P., et al., "Lotus Notes Network Design", McGraw-Hill, 1996.
Tamura, Randall A., et al., *Lotus Notes 4 Unleashed*, Sams Publishing, 1996.
Dahl, Andrew, *Lotus Notes 4 Administrator's Survival Guide*, Sams Publishing, 1996.
Netscape Communications Corporation, Administrator's Guide, Netscape News Server, Version 2.0, 1996.
Lotus Development Corporation, *Lotus Notes Internet Cookbook for Notes Release 3*, Jan. 16, 1996.
Wong, Harry, "Casahl's Replic-Action: Delivering True Notes/DBMS Integration", *The View Technical Journal for Lotus Notes® Software*, vol. 2, Issue 1, Jan./Feb. 1996, pp. 33-50.

*Lotus Notes Advisor*, Advisor Publications, Jan./Feb. 1996, entire magazine.
IBM International Technical Support Organization, *Lotus Notes Release 4* In *a Multiplatform Environment*, Feb. 1996.
Lotus Development Corporation, *Lotus Notes Internet Cookbook for Notes Release 4*, Feb. 14, 1996.
Blaney, Jeff, "You Can Take it with you: An Introduction to Mobile Computing with Notes R4", *The View Technical Journal for Lotus Notes® Software*, vol. 2, Issue 1, Jan./Feb. 1996, pp. 22-32.
*Lotus Notes Advisor*, Advisor Publications, Apr. 1996, entire magazine.
Frenkel, Garry, "Pumping for Info: Notes and Database Integration", *Network Computing*, May 1, 1996, pp. 76-84.
Lotus Development Corporation, Lotus Notes Knowledge Base, "Firewall Security Overview and How Firewalls Relate to Lotus Notes", May 22, 1996.
*Lotus Notes Advisor*, Advisor Publications, Jun. 1996, entire magazine.
Augun, Audry, "Integrating Lotus Notes with Enterprise Data", Lotus Notes Advisor, Advisor Publications, Jul./Aug. 1996, pp. 22-25.
*Lotus Notes Advisor*, Advisor Publications, Aug. 1996, entire magazine.
IBM Corporation, *Secrets to Running Lotus Notes: The Decisions No One Tells You How to Make*, Oct. 1996.
*Lotus Notes Advisor*, Advisor Publications, Oct. 1996, entire magazine.
Opyt, Barbara, et al., "Use the Internet as Your Lotus Notes WAN", *Lotus Notes Advisor*, Advisor Publications, Nov./Dec. 1996, pp. 17-20.
*Lotus Notes Advisor*, Advisor Publications, Dec. 1996, entire magazine.
Swedeen, Bret, et al., "Under the Microscope: Domino Replication", *LDD Today*, Oct. 1, 1998.
Lotus Development Corporation, *Lotus Inside Notes: The Architecture of Notes and the Domino Server*, 2000.
"The History of Notes and Domino", Lotus Developer Domain, Lotus, Sep. 29, 2003.
International Search Report for PCT/US05/37702, Date of completion Oct. 24, 2007; Date of Mailing Nov. 5, 2007; ISA/US.
International Search Report for PCT/US05/038135, Date of completion, Jan. 30, 2007; Mailing Date Aug. 8, 2008; ISA/US.
International Search Report for PCT/US03/00618, Date of completion Mar. 19, 2003; Date of Mailing Apr. 4, 2003; ISA/US.
International Search Report for PCT/US03/00624, Date of completion, Apr. 8, 2003; Date of Mailing May 13, 2003; ISA/US.
Lotus Development Corporation, Lotus Notes: The Groupware Standard-Windows, 1994.
International Preliminary Examination Report for PCT/US05/37702, Date of completion Nov. 20, 2007; ISA/US.
Written Opinion of the International Searching Authority for PCT/US05/37702; Date of completion Oct. 24, 2007; Date of mailing Nov. 5, 2007; ISA/US.
Written Opinion of the International Searching Authority for PCT/US05/38135; Date of completion Jul. 14, 2008; Date of mailing Aug. 8, 2008; ISA/US.
Stolowitz Ford Cowger, LLP, Listing of Related Cases, Jul. 13, 2009.
Victor S. Miller, "Use of Elliptic Curves in Cryptography", Lecture Notes in Computer Science, May 21, 1986, vol. 218, p. 417-426, Advances in Cryptology-CRYPTO' 85.
Haas et al., "The design and performance of mobile TCP for wireless networks", Journal of High Speed Networks, IOS Press, Amsterdam NL, vol. 10, No. 3; Jan. 1, 2001; pp. 187-207.
Haas et al., "Mobile-TCP: an asymmetric transport protocol design for mobile systems", Communications 1997, ICC '97 Montreal, Towards the Knowledge Millennium 1997 IEEE International Conference on Montreal, Que., Canada; Jun. 8, 1997; pp. 1054-1058.
Maltz et al., "MSOCKS: an architecture for transport layer mobility", Infocom '98, Seventeenth Annual Joint Conference of the IEEE Computer and Communications Societies, Proceedings, IEEE San Francisco, CA; Mar. 29, 1998; pp. 1037-1045.
Supplementary European Search Report for EP03705704; May 31, 2010; 4 pages.
Allchin, James Edward, "An Architecture for Reliable Decentralized Systems," Ph.D. Thesis, Georgia Institute of Technology, 185 pages, Sep. 1983.
Bedell, Doug, "Meeting Your New Best Friends Six Degrees Widens Your Contacts In Exchange For Sampling Web Sites," The Dallas Morning News, 4 pages, Oct. 27, 1998.
Bergman, Lawrence D. et al., "Programming-By-Demonstration For Behavior-Based User Interface Customization," IBM Research Report, RC23116, 5 pages, Feb. 20, 2004.
B'Far, Reza et al., "Designing Effective User Interfaces For Wireless Devices," Publication Unknown, 14 pages, Date Unknown.
"Chapter: About NotesPump," Publication Unknown, 480 pages, Date Unknown.
"Chapter 13-1—Anatomy of A Note ID," Publication Unknown, 8 pages, Date Unknown.
Decker, Stefan et al., "The Social Semantic Desktop," Digital Enterprise Research Institute, DERI Technical Report May 2, 2004, 7 pages, May 2004.
European Patent Application No. EP 03707338.4, Supplementary European Search Report, 2 pages, Apr. 18, 2011.
Freeland, Pat et al., "Lotus Notes 3-3.1 for Dummies™, " IDG Books Worldwide, 389 pages, 1994.
Gameline, Advertisement, 1 page, 1982.
Gewirtz, David, "Lotus Notes 3 Revealed!," Prima Publishing, 261 pages, 1994.
Hardy, Ed, "Microsoft Proposes Two New Thumb-Driven User Interfaces," Brighthand Consulting, Inc., 2 pages, 2003.
ImTOO, "ImTOO iPod Movie Converter," 3 pages, Nov. 9, 2005.
IntelliLink Corporation, "IntelliLink® For Windows User's Guide," Version 3.0, 167 pages, 1994.
International Application No. PCT/US2006/023426, International Search Report, 1 page, Feb. 21, 2007.
International Application No. PCT/US2006/023427, International Search Report, 1 page, Oct. 12, 2006.
International Application No. PCT/US2007/014462, International Search Report, 1 page, Jul. 2, 2008.
International Application No. PCT/US2007/014497, International Search Report, 1 page, Aug. 25, 2008.
Japanese Patent Application No. 2003-558726, Office Action, 2 pages, Jun. 10, 2008.
Karlson, Amy K. et al., "AppLens and LaunchTile: Two Designs For One-Handed Thumb Use On Small Devices," Proceedings of CHI 2005, 10 pages, Apr. 2-7, 2005.
Kent, S. et al., "Security Architecture For The Internet Protocol," RFC 2401,The Internet Society, 62 pages, Nov. 1998.
Kleinberg, Jon, "The Small-World Phenomenon: An Algorithmic Perspective," Cornell Computer Science Technical Report 99-1776, 14 pages, Oct. 1999.
Koeppel, Dan, "GUIs Just Want To Have Fun," Wired Magazine, Issue 8.10, 12 pages, Oct. 2000.
Kornblith, Polly Russell, "Lotus Notes Answers: Certified Tech Support," Covers Release 3, McGraw-Hill, Inc., 326 pages, 1994.
Lotus Development Corporation, "Lotus Notes Administration," Release 3.3, 20 pages, 1995.
Lotus Development Corporation, "Lotus Notes Administrators Guide—Server For NetWare, OS-2, And Unix," Release 3.1, 509 pages, 1994.
Lotus Development Corporation, "Lotus Notes Administrators Guide—Server For Windows," Release 3.1, 345 pages, 1994.
Lotus Development Corporation, "Lotus Notes Customer Service Application Guide," Release 3.1, 46 pages, 1994.
Lotus Development Corporation, "Lotus Notes Customer Support Guide," 33 pages, Date Unknown.
Lotus Development Corporation, "Lotus Notes Customer Support Guide—North American Guide," Release 4.1, 51 pages, Date Unknown.
Lotus Development Corporation, "Lotus Notes Getting Started With Application Development," Release 3.1, 151 pages, 1994.
Lotus Development Corporation, "Lotus Notes Internotes Web Navigator Administrator's Guide," Release 4, 60 pages, 1995.
Lotus Development Corporation, "Lotus Notes LotusScript Classes For Notes," Release 4, 6 pages, Date Unknown.

Lotus Development Corporation, "Lotus Notes Network Driver Documentation," Release 3.1, 100 pages, 1994.
Lotus Development Corporation, "Lotus Notes Quick Reference For Application Developers," Release 3, 6 pages, Date Unknown.
Lotus Development Corporation, "Lotus Notes Quick Reference For Macintosh," Release 3, 6 pages, Date Unknown.
Lotus Development Corporation, "Lotus Notes Quick Reference For SmartIcons," Release 3.1, 4 pages, Date Unknown.
Lotus Development Corporation, "Lotus Notes Quick Reference For Windows And Presentation Manager," Release 3, 6 pages, Date Unknown.
Lotus Development Corporation, "Lotus Notes Site And Systems Planning Guide," Release 3.1, 169 pages, 1994.
Lotus Development Corporation, "Lotus Notes Start Here—Workstation Install For Windows, OS-2 And Macintosh," Release 3.3, 47 pages, 1995.
Lotus Development Corporation, "Lotus Software Agreement," 8 pages, Date Unknown.
"Lotus Notes—Notes Administration Help," Screen Shots, 17 pages, Date Unknown.
MacGregor, Rob et al., "The Domino Defense: Security In Lotus Notes And The Internet," IBM Corporation, 183 pages, Dec. 1997.
Mason, Luke, "Windows XP: New GUI Design Shows Skin Is In," TechRepublic, 4 pages, Apr. 4, 2001.
McMullen, Melanie, "Network Remote Access And Mobile Computing," Miller Freeman Inc., 226 pages, 1994.
Microsoft, Definition of "Access," Microsoft Computer Dictionary, Fifth Edition, 2 pages, May 1, 2002.
Microsoft, Definition of "Synchronization," Microsoft Computer Dictionary, Fifth Edition, 2 pages, May 1, 2002.
Milgram, Stanley, "The Small-World Problem," Psychology Today, vol. 2, pp. 60-67, 1967.
Myers, Brad A. et al., "Extending The Windows Desktop Interface With Connected Handheld Computers," WSS'00 Proceedings of the 4th Conference on USENIX Windows Systems Symposium, vol. 4, 10 pages, 2000.
Myers, Brad A. et al., "User Interfaces That Span Hand-Held And Fixed Devices," CHI'2001 Workshop on Distributed and Disappearing User Interfaces in Ubiquitous Computer, 4 pages, 2001.
National Institute of Standards and Technology, "Advanced Encryption Standard (AES)," Federal Information Processing Standards Publication 197, 52 pages, Nov. 26, 2001.
National Institute of Standards and Technology, "Secure Hash Standard," Federal Information Processing Standards Publication 180-2, 83 pages, Aug. 1, 2002.
Niederée, Claudia et al., "A Multi-Dimensional, Unified User Model For Cross-System Personalization," Proceedings of the AVI 2004 Workshop on Environments for Personalized Information Access, 11 pages, 2004.
Nokia, "Developer Platforms," 3 pages, 2005.
"NotesPump 1.0 Release Notes," Publication Unknown, 8 pages, Date Unknown.
Ortiz, C. Enrique, "An Introduction To The Symbian OS™ Platform for Palm OS® Developers," Metrowerks Corp., 21 pages, 2002.
"Overview—What Is Lotus NotesPump?," Publication Unknown, 88 pages, Date Unknown.
Phillips, Joshua et al., "Modeling The Intelligence Analysis Process For Intelligent User Agent Development," Research and Practice in Human Resource Management, vol. 9, No. 1, pp. 59-73, 2001.
Ringel, Meredith et al., "iStuff: A Scalable Architecture For Lightweight, Wireless Devices For Ubicomp User Interfaces," Proceedings of UbiComp 2002, 2 pages, 2002.
Shafran, Andrew Bryce, "Easy Lotus Notes® For Windows™," Que Corporation, 199 pages, 1994.
Signorini, Eugene, "SEVEN's Service-Based Wireless Solutions Enable Enterprises To Untether E-Mail," Wireless/Mobile Enterprise & Commerce, 16 pages, Oct. 2004.
U.S. Appl. No. 60/663,463, File History, 113 pages, Mar. 18, 2005.
Vivacqua, Adriana et al., "Profiling And Matchmaking Strategies In Support Of Opportunistic Collaboration," CoopIS/DOA/ODBASE 2003, LNCS 2888, pp. 162-177, 2003.
Wilcox, Adam A., "PC Learning Labs Teaches Lotus Notes 3.0," Ziff-Davis Press, 381 pages, 1993.

* cited by examiner

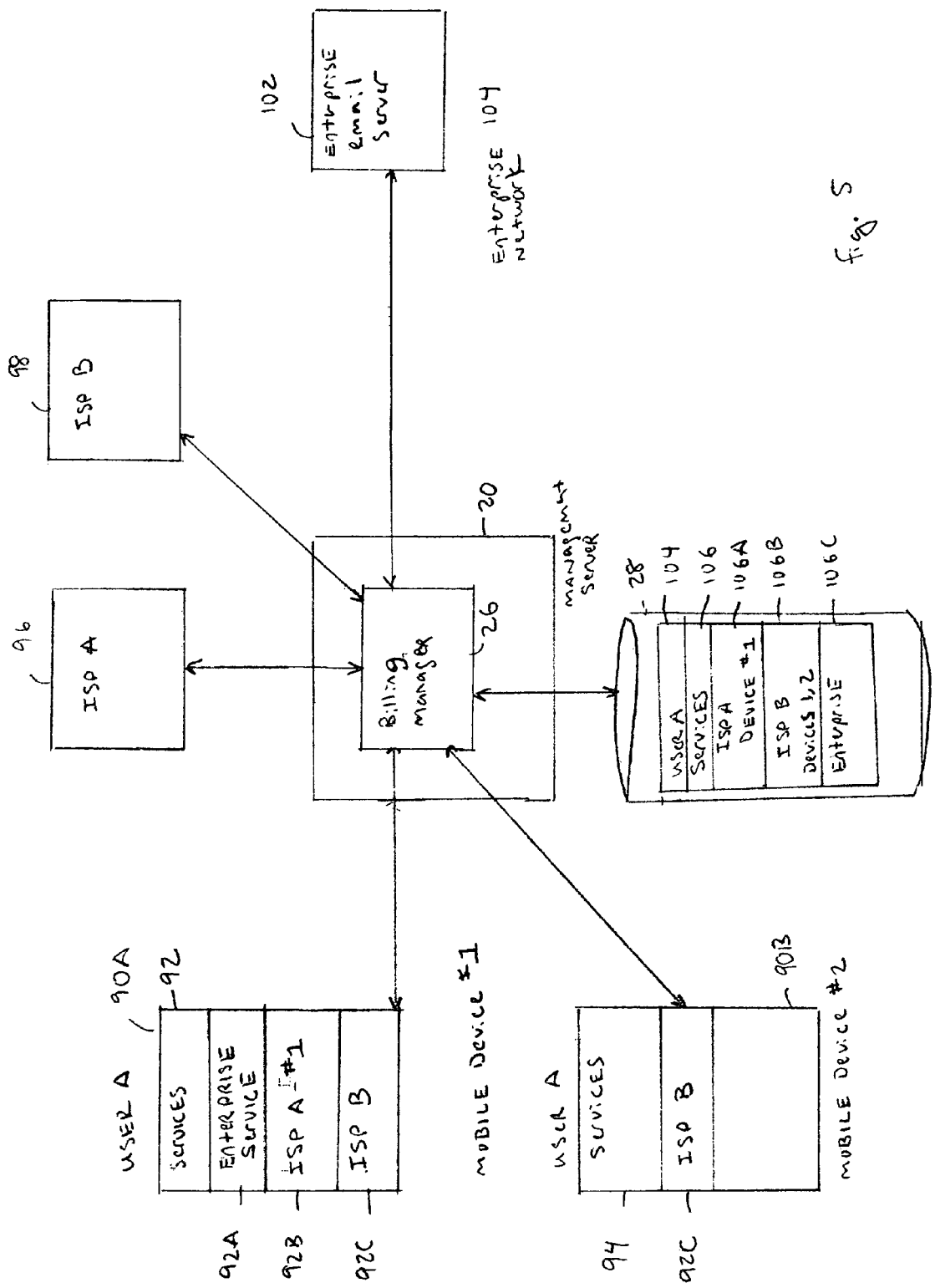

```xml
<?xml version="1.0" encoding="UTF-8" ?>
<IPDRDoc xmlns="http://www.ipdr.org/namespaces/ipdr"
 xmlns:seven="http://www.seven.com/ipdr/namespace"
 xmlns:xsi="http://www.w3.org/2001/XMLSchema-instance"
 xsi:noNamespaceSchemaLocation="http://www.seven.com/ipdr/s7Service.xsd"
 docId="f81d4fae-7dec-11d0-a765-00a0c91e6bf6" version="3.1" creationTime="2004-04-28T10:00:00Z" IPDRRecorderInfo="ce.wirelessoperator.com">

<IPDR>
  <IPDRCreationTime>2004-04-28T08:50:00Z</IPDRCreationTime>
  <seqNum>0</seqNum>
  <serviceType>consumerEdition</serviceType>
  <serviceProviderID>WirelessOperator</serviceProviderID>
  <sessionID>5c2197a800ce93a401e736f4e2961f8e</sessionID>
  <startTime>2004-04-28T08:50:00Z</startTime>
  <endTime>2004-04-28T08:52:03Z</endTime>
  <duration>2</duration>
  <username>juser</username>
  <MIN>6501234567</MIN>
  <NAI>juser@wirelessoperator.com</NAI>
  <device>sd_j2me</device>
  <mailFolderViews>3</mailFolderViews>
  <messagesDelivered>8</messagesDelivered>
  <messagesSent>2</messagesSent>
  <calendarItemsViewed>3</calendarItemsViewed>
</IPDR>

<IPDR>
  <IPDRCreationTime>2004-04-28T08:51:00Z</IPDRCreationTime>
  <seqNum>1</seqNum>
  <serviceType>consumerEdition</serviceType>
  <serviceProviderID>WirelessOperator</serviceProviderID>
  <sessionID>3a5b26d07308f1e7ff206cafab33c57a</sessionID>
  <startTime>2004-04-28T08:51:00Z</startTime>
  <endTime>2004-04-28T08:55:03Z</endTime>
  <duration>4</duration>
  <username>sammy7</username>
  <MIN>4087654321</MIN>
  <NAI>sammy7@wirelessoperator.com</NAI>
  <device>sd_palmos</device>
  <mailFolderViews>2</mailFolderViews>
  <messagesDelivered>10</messagesDelivered>
  <messagesSent>1</messagesSent>
  <messagesSentWithAttachments>1</messagesSentWithAttachments>
  <attachmentsViewed>3</attachmentsViewed>
</IPDR>
<IPDRDoc.End count="2" endTime="2004-04-28T10:00:15Z" />
</IPDRDoc>
```

FIG. 7

NON-SERVICE EVENTS

| Non-service Event Type | Non-service Event Code |
|---|---|
| SESSION_CLOSE | 0 |
| USER_ADD | 1 |
| USER_DELETE | 2 |
| USER_SUSPEND | 3 |
| USER_REACTIVATE | 4 |
| USER_ACTIVATE | 5 |
| USER_UPDATE | 6 |
| USER_PASSWORD_CHANGED | 7 |
| USER_PASSWORD_RESET | 8 |
| ENTERPRISE_ADD | 11 |
| ENTERPRISE_DELETE | 12 |
| ENTERPRISE_SUSPEND | 13 |
| ENTERPRISE_REACTIVATE | 14 |
| ENTERPRISE_ACTIVATE | 15 |
| ENTERPRISE_UPDATE | 16 |
| SERVICE_ADD | 17 |
| SERVICE_DELETE | 18 |
| SERVICE_SUSPEND | 19 |
| SERVICE_REACTIVATE | 20 |
| SERVICE_ACTIVATE | 21 |
| SERVICE_UPDATE | 22 |
| SERVICE_CREDENTIALS_SET | 23 |
| SERVICE_CONF_ADD | 24 |
| SERVICE_CONF_DELETE | 25 |
| SERVICE_CONF_SUSPEND | 26 |
| SERVICE_CONF_REACTIVATE | 27 |
| SERVICE_CONF_ACTIVATE | 28 |
| SERVICE_CONF_UPDATE | 29 |
| SECURITY_SETTINGS_UPDATE | 30 |
| LINK_ADD | 31 |
| LINK_DELETE | 32 |

Fig 8A

| | |
|---|---|
| LINK_UPDATE | 33 |
| LINK_CLICKED | 34 |
| WORKSPACE_EDIT | 35 |
| WORKSPACE_VIEW | 36 |
| SEARCH | 37 |
| SORT | 38 |
| REPORT_VIEW | 39 |
| REPORT_DATA_EXPORT | 40 |
| EVENT_REPORT_EXPORT | 41 |
| HTTPACCESS | 42 |
| LOGOUT | 43 |
| LOGIN | 44 |
| FIRST_EVENT | 103 |

SERVICE EVENTS

| Service Event Type | Service Event Code |
|---|---|
| SERVICE_PASSWORD_CHANGED | 9 |
| MOBILE_PASSWORD_CHANGED | 10 |
| MAIL_FOLDER_VIEW | 45 |
| MAIL_MESSAGE_DELETE | 48 |
| MAIL_MESSAGE_UNREAD | 49 |
| MAIL_MESSAGE_COMPOSE | 50 |
| CONTACTS_PERS_ADDRESSBOOK_VIEW | 51 |
| CONTACTS_PERS_SEARCH | 52 |
| CONTACTS_PERS_NAVIGATE | 53 |
| CONTACTS_PERS_CONTACT_VIEW | 54 |
| CONTACTS_PERS_CONTACT_DELETE | 55 |
| CONTACTS_PERS_CONTACT_ADD | 56 |
| CONTACTS_PERS_CONTACT_EDIT | 57 |
| CONTACTS_CALL_INITIATE | 58 |
| CONTACTS_MAIL_INITIATE | 59 |
| TASKS_ALLTASKS_VIEW | 60 |
| TASKS_TASK_VIEW | 61 |
| TASKS_TASK_DELETE | 62 |
| TASKS_TASK_DONE | 63 |
| TASKS_TASK_ADD | 64 |

Fig 8B

| | |
|---|---|
| TASKS_TASK_EDIT | 65 |
| CALENDAR_CALENDAR_VIEW | 66 |
| CALENDAR_JUMP_TO | 67 |
| CALENDAR_NAVIGATE | 68 |
| CALENDAR_APPOINTMENT_VIEW | 69 |
| CALENDAR_APPOINTMENT_DELETE | 70 |
| CALENDAR_APPOINTMENT_ADD | 71 |
| CALENDAR_APPOINTMENT_EDIT | 72 |
| DOCUMENT_BROWSE | 73 |
| MEETING_REQUEST_CANCEL | 76 |
| MEETING_REQUEST_DELETE | 77 |
| MEETING_REQUEST_ACCEPT | 78 |
| MEETING_REQUEST_DECLINE | 79 |
| MEETING_REQUEST_TENATIVE | 80 |
| CONTACTS_CORP_CONTACT_VIEW | 81 |
| CONTACTS_CORP_CONTACT_DELETE | 82 |
| CONTACTS_CORP_CONTACT_ADD | 83 |
| CONTACTS_CORP_CONTACT_EDIT | 84 |
| ATTACHMENT_FAX | 86 |
| DOCUMENT_FAX | 87 |
| MAIL_ALLFOLDERS_VIEW | 88 |
| MAIL_CREATEFOLDER | 89 |
| MAIL_RENAMEFOLDER | 90 |
| MAIL_MOVEFOLDER | 91 |
| MAIL_DELETEFOLDER | 92 |
| MAIL_MOVE_MESSAGES | 93 |
| MAIL_COPY_MESSAGES | 94 |
| CONTACTS_CORP_ADDRESSBOOK_VIEW | 95 |
| CONTACTS_CORP_SEARCH | 96 |
| CONTACTS_CORP_NAVIGATE | 97 |
| FILEVIEW_VIEW_ATTACHMENT | 98 |
| FILEVIEW_VIEW_DOCUMENT | 99 |
| FIRST_EVENT | 103 |

Fig 8C

EVENT TYPES

| Event type | Event code | Attribute | Comment |
| --- | --- | --- | --- |
| MAIL_MESSAGE_VIEW | 46 | Size | Size of message read/delivered to device |
| MAIL_MESSAGE_SENT | 47 | Size | Size of message sent |
| DOCUMENT_GET | 74 | Size | Size of document retrieved |
| DOCUMENT_GET | 74 | Type | Content type of document retrieved |
| MAIL_MESSAGE_SENT_ATTACHMENTS | 75 | Size | Size of document retrieved |
| MAIL_MESSAGE_SENT_ATTACHMENTS | 75 | Type | Content type of document retrieved |
| ATTACHMENT_VIEW | 85 | Size | Size of document retrieved |
| ATTACHMENT_VIEW | 85 | Type | Content type of document retrieved |
| FILEVIEW_TRANSFORM | 100 | Size | Size of document transformed |
| SYNC_START | 101 | Type | Type of sync - [1=delta, 3=full] |
| SYNC_START | 101 | Reason | Sync reason - [1=manual,2=sched,3-6=auto,7=trig_ip,8=trig_sms] |

Fig. 8D

FLEXIBLE BILLING ARCHITECTURE

BACKGROUND

Mobile communication systems transport electronic mail (email), text messages, text files, images, and any other types of digital data and communications to wireless devices. Typically these mobile communication systems bill users on a per-month basis. However, a simple monthly service plan may not effectively or fairly bill for the types of services or operations used by the subscriber.

For example, one subscriber may use a wireless device for relatively short periods of time but often uses the wireless device during those time periods to transmit and receive relatively large files. Alternatively, another subscriber may use the wireless device more frequently but for relatively small data exchanges. In another example, a subscriber may use a relatively large number of services compared with another subscriber. For example the subscriber may access multiple different Internet Service Providers (ISP) email accounts from the same mobile device.

Current mobile communication systems, that transmit different types of digital data, such as messages, files, images, etc., are not capable of effectively billing subscribers for the wide variety of different communication events and services that may be used on mobile devices. The present invention addresses this and other problems associated with the prior art.

SUMMARY OF THE INVENTION

A flexible billing system captures communication events on a more granular level then current communication systems. The captured communication events may then be aggregated into different event categories and combined with other event parameters to provide a wider variety of billing options to mobile network operators. The flexible billing system can be integrated with existing billing and provisioning systems. Thus, subscribers can be billed for enabled data access services (and, possibly, only their actual usage) and services are only enabled for billable entities.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 5 is a block diagram showing how different services and different associated events are tracked by a management server.

FIG. 6 is a block diagram showing how the flexible billing system can uniquely identify different users and services.

FIG. 7 shows a sample event report generated by the flexible billing system.

FIG. 8 shows a sample event table that can be used in the flexible billing system.

DETAILED DESCRIPTION

Figure 1:
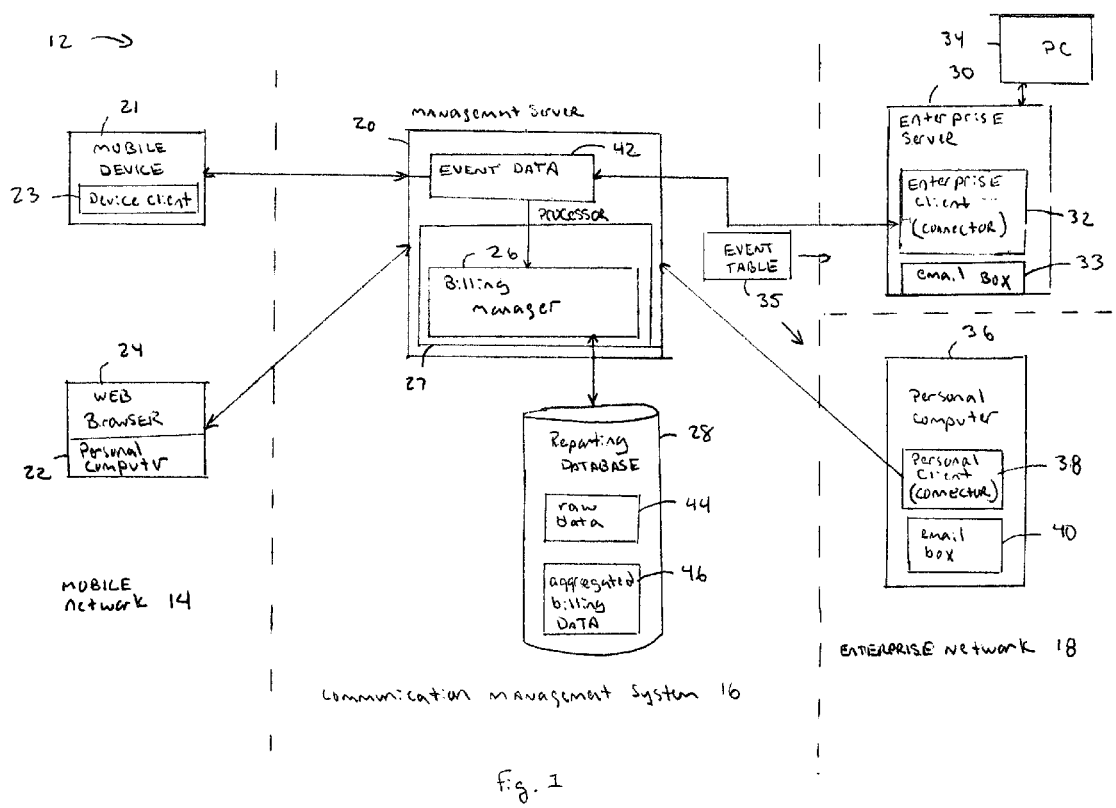
FIG. 1 is a block diagram of a communication system that implements a flexible billing system.

FIG. 1 shows an example of a mobile text communication network 12 that may operate similarly to the networks described in U.S. patent application Ser. No. 10/339,368 entitled: CONNECTION ARCHITECTURE FOR A MOBILE NETWORK, filed Jan. 8, 2003, and U.S. patent application Ser. No. 10/339,369 entitled: SECURE TRANSPORT FOR MOBILE COMMUNICATION NETWORK, filed Jan. 8, 2003, which are both herein incorporated by reference.

The communication system 12 in one implementation captures event data 42 that is then used for providing more flexible billing reports to network operators. An operator is referred to below as any telecommunication provider that may need to bill or track some portion of the communications conducted over communication system 12.

The communication system 12 includes a mobile wireless network 14, an enterprise network 18, and a communication management system 16 that manages communications between the mobile wireless network 14 and the enterprise network 18. The mobile network 14 includes a mobile device 21 that operates a device client 23 that communicates with an IP infrastructure through a wireless or landline mobile network operator. Since mobile networks 14 are well known, they are not described in further detail. Alternatively, a web browser 24 operated on a personal computer or other computer terminal 22 may communicate with the enterprise network 18 through communication management system 16.

The enterprise network 18 can be any business network, individual user network, or local computer system that maintains local email or other data for one or more users. In the system shown in FIG. 1, the enterprise network 18 can include an enterprise server 30 that may contain a user mailbox 33 accessible by a Personal Computer (PC) 34. In one example, the enterprise server 30 may be a Microsoft® Exchange® server and the PC 34 may access the mailbox 33 through a Microsoft® Outlook® software application. The mailbox 33 and enterprise server 30 may contain emails, contact lists, calendars, tasks, notes, files, or any other type of data or electronic document that may be accessed by mobile device 21 or personal computer 22. An enterprise client 32 operated in enterprise server 30 operates as a connector for communicating with management server 20.

In another enterprise configuration, a personal computer 36 operates an email box 40 without use of an enterprise server. A personal client 38 on the PC 36 operates as a connector for communicating with devices in mobile network 14 via management server 20. Enterprise client software 32 in the enterprise server 30 or personal client software 38 in the PC 36 enable the mobile device 21 or PC 22 to access email, calendars, and contact information as well as local files in enterprise network 18 associated with PCs 34 and 36.

The communication management system 16 includes one or more management servers 20 that each include a processor 27. The processor 27 operates a transfer agent (not shown) that manages the transactions between the mobile device 21 and PC 22 and the enterprise network 18. A user database (not shown) includes configuration information for different users of the mobile communication service. For example, the user database may include login data for mobile device 21 or remote PC 22.

While referred to as a communication management system 16 and management server 20, this can be any intermediary system that includes one or more intermediary servers that operate between the mobile network 14 and the enterprise network 18. For example, a separate Smart Device Server (SDS) may be used in management system 16 for handling communications with mobile devices in mobile network 14. Correspondingly, a Slingshot Connection Server (SCS) may be used for handling communications with enterprise networks 18.

Flexible Billing System

The management server 16 operates a software billing manager 26 that captures event data 42 used for operator billing. The billing manager outputs the raw data 44 aggregated in periodic intervals, such as every 15 minutes. The aggregation may happen in the reporting database 28 or may happen outside of the database 28.

The captured billing data 44 or 46 may be delivered to a network operator computer either in a batch (e.g. file-based) or real-time (e.g. streaming) format. The billing data is integrated with existing billing infrastructures through the use of built-in or custom billing adapters that convert the data 44 or 46 into a data format used by the operator. The captured event data 44 or 46 can also be formatted into an industry-standard SQL database that can be used with custom query or extraction tools.

Report Configuration

Once an appropriate integration strategy has been devised that meets the operator billing requirements, this information may be used within the billing manager 26 to configure an event table 35 shown in one example in FIG. 8. The event table 35 operates as a filter to identify what attributes are detected for different events by the billing system.

In this example, the event table 35 operates like a filter to notify the billing manager 26, enterprise client 32 and/or personal client 38 what events and/or event attributes should be extracted from the communications between mobile network 14 and enterprise network 18 for different events. The clients 32 or 38 and the billing manager 26 then extract the events and/or associated attributes according to the flagged items in event table 35. The event table shown in FIG. 8 will be described in more detail below.

Figure 2:
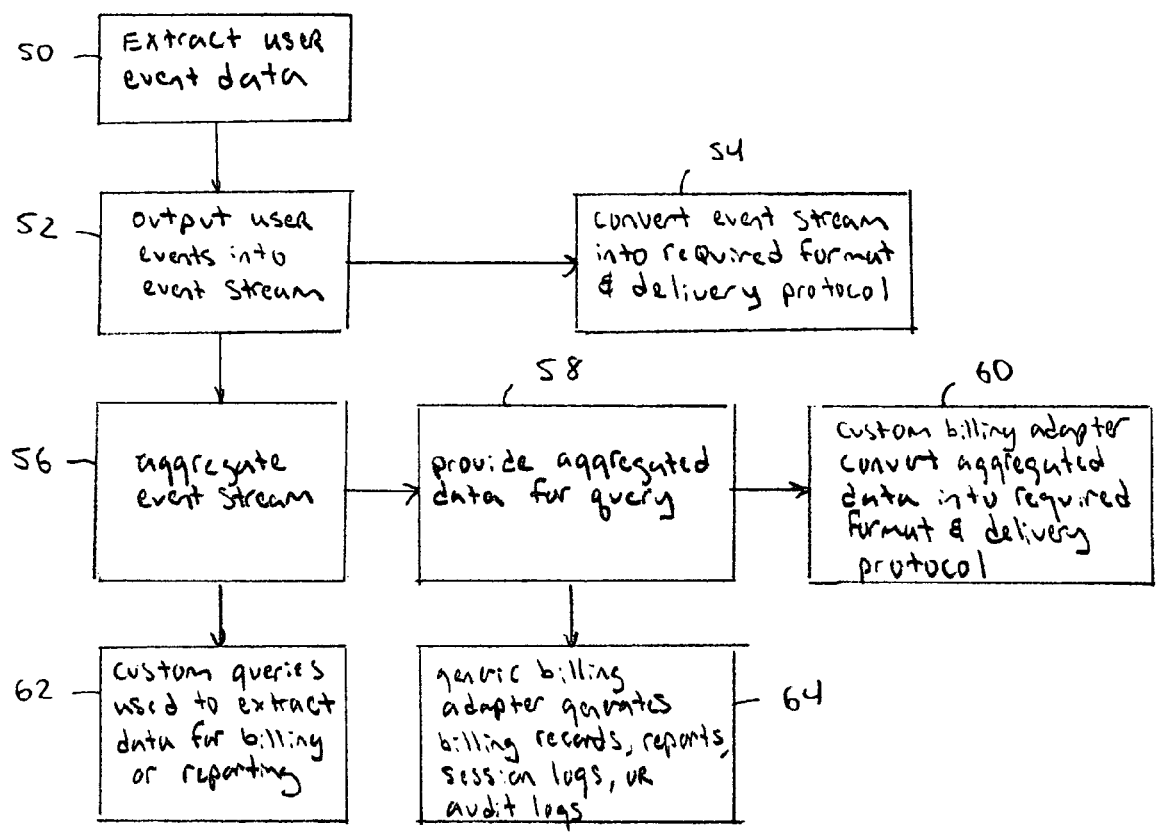
FIG. 2 is a flow diagram describing how events can be formatted and aggregated for different operator requirements.

FIG. 2 shows in more detail how the billing manager 26 in management server 20 may aggregate and format captured events data 42. In operation 50, the billing manager and/or the clients 32 or 38 in enterprise network 18, extract event data during communication activities between the mobile device 21 or remote PC 22 and the enterprise network 18. The extracted event data is output as a raw event stream in operation 52. The raw event stream may be converted into a format and delivery protocol required by the operator in operation 54. For example, the network operator may require the raw event stream to be formatted in a particular database format and then delivered to an operator billing server via an Internet transaction using a File Transport Protocol (FTP).

Alternatively, the raw event stream may be aggregated by the reporting database 28 in operation 56. There are various different aggregation categories and different dimensions within each aggregation category that will be described in more detail below. The aggregated data is then provided for querying in operation 58. In one implementation, the data is aggregated into a format that allows querying using a structured query language, such as Structured Query Language (SQL). The queried data can then be converted into a required format and delivery protocol in operation 60.

Custom queries can be performed in operation 62 to extract data from the aggregated event stream. For example, the custom query in operation 62 can be used for extracting data for billing or reports that are used by the network operator. In operation 64, the billing manager 26 in FIG. 1 may provide a generic billing adapter that generates billing records, reports, session logs, or audit logs. The generic billing adapter abstracts specific billing format and transmission requirements. The extensible framework in FIG. 2 facilitates billing integration with a large variety of different mobile network operators. Industry-standard reporting tools, such as Crystal Reports, may be integrated with the captured event data to provide mobile operators with familiar interfaces and formats.

The billing manager 26 in FIG. 1 can generate a standard set of reports based upon the aggregated event data. This enables operators to have quick and easy access to service and usage data. For example, the billing manger 26 can identify the total requests made by mobile device 21, by service, and by time. User sessions and an average duration of the user sessions can be identified by device, by month provisioned, and by time. Billing reports can also identify the number of requests by type of request, by device, by month provisioned, or by time. Billing reports can also identify provisioned and active users, by month provisioned and by time. Session logs or audio logs can also be generated by date range.

This has several advantages. For example, an operator may be able to bill a subscriber based on the number of user initiated events independently of how long the user is actually connected in a wireless session. Alternatively, the billing manager 26 may also track when and how long each mobile device session is active to provide an alternate flat rate per day, month or year billing plan independent of the number of user initiated events during that identified time period.

Centralized Event-Tracking

Figure 3:
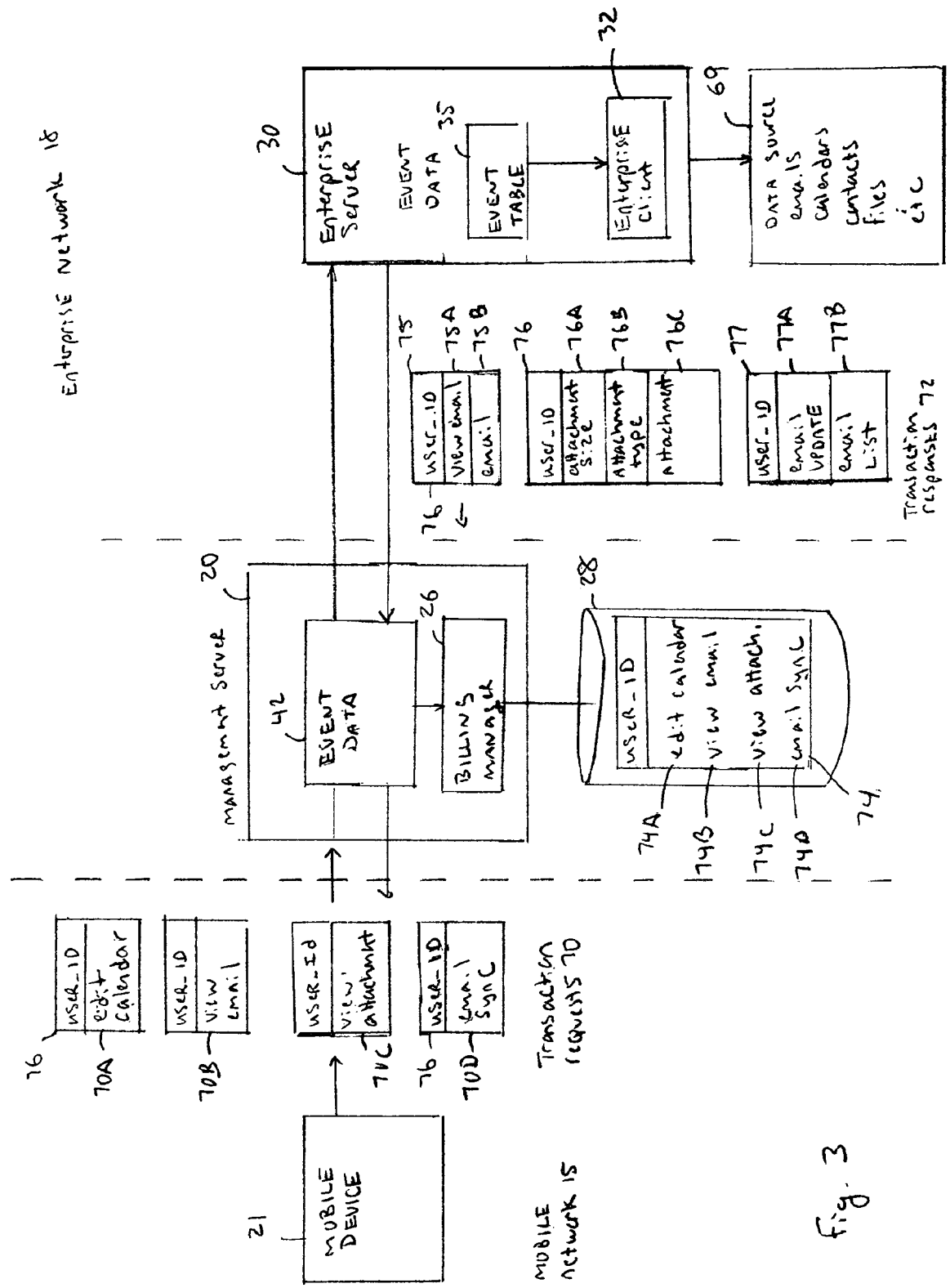
FIG. 3 is a block diagram showing how transaction events are tracked by a central billing manager.

FIG. 3 shows in more detail how the billing manager 26 can track specific events in user transactions 70 and 72. This is described in more detail in U.S. patent application Ser. No. 10/339,368 entitled: CONNECTION ARCHITECTURE FOR A MOBILE NETWORK, filed Jan. 8, 2003, and U.S. patent application Ser. No. 10/339,369 entitled: SECURE TRANSPORT FOR MOBILE COMMUNICATION NETWORK, filed Jan. 8, 2003, which have both already been incorporated by reference.

In this example, the mobile device 21 initiates different transaction requests 70. Each transaction request 70 can be associated with a particular user using attributes such as a user_id, IP address, or, phone number. In this example, the transaction requests 70 are all initiated from the same mobile device 21 and all have a same associated user id 76. The billing manager 26 therefore identifies all transaction requests 70 as associated with a same user (subscriber).

In this example, the mobile device 21 sends an edit calendar request 70A to the enterprise network 18. The transaction request 70A is sent to management server 20 which then forwards the request 70A to enterprise network 18. The billing manager 26 in management server 20 identifies the message as an edit calendar transaction according to an associated event code contained in request 70A. Accordingly, the billing manager 26 captures and stores the edit calendar event as entry 74A in billing record 74.

The billing manager 26 may also capture a view email transaction request 70B as entry 74B in billing record 74. In response to the view email request 70B, the enterprise server 30 may send back an email response 75. After viewing the email 75B, the user of mobile device 21 may send a view attachment request 70C for a file identified as attached to the email 75B. The billing manager 26 may also detect and identify the view attachment request 70C. Accordingly, a view attachment entry 74C is entered by billing manager 26 into billing record 74.

It should be noted that the billing manager 26 can detect event data 42 that comes from mobile device 21 and/or from the enterprise network 18. For example, the billing manager 26 may detect the transaction response 76 that contains the attachment requested by view attachment request 70C. It may be necessary to monitor the transaction responses 72 from enterprise network 18 in order to identify other events or event parameters that may not be detectable from the mobile device transaction requests 70. For example, the billing manager 26 may need to also monitor transaction responses 72 in order to determine the size of the returned attachment 76C.

Communications between mobile device 21 and enterprise network 18 may be end-to-end encrypted as described in U.S. patent application Ser. No. 10/339,369 entitled: SECURE TRANSPORT FOR MOBILE COMMUNICATION NETWORK, filed Jan. 8, 2003, which has already been incorporated by reference. In this end-to-end encryption environment, billing manager 26 may not be able to identify the encrypted events in transaction requests 70. In this situation, the billing manager 26 may receive the event information from enterprise client 32 operated by a processor in enterprise server 30.

The enterprise client 32 has access to the end-to-end key that is used to encrypt transaction requests 70. Thus, the client 32 can view the decrypted contents in transaction requests 70. Client 32 also has access to the event table 35 previously sent to enterprise server 30 as described above in FIG. 1. Accordingly, the Enterprise Client (connector) 32 can identify the decrypted events received from and sent to mobile device 21 and then capture the events or event attributes that correspond to the items flagged in event table 35. The personal client 38 in FIG. 1 can operate in a similar manner.

The enterprise client 32 attaches point-to-point encrypted labels to the transaction responses 72 that identify the different events and parameters that can not be identified by billing manger 26 from transaction requests 70. For example the client 32 may attach a view mail event identifier 75A to the email 75B sent back to mobile device 21 in response to transaction request 70B. Similarly, the connector 21 may also include an attachment size label 76A and an attachment type label 76B to the attachment 76C sent back to mobile device 21 in response to view attachment request 70C.

The attachment size label 76A allows the billing manger 26 to generate a billing report that the operator can use to bill subscribers according to transferred file size. The attachment type identifier 76B allows the billing manger 26 to generate billing information based on different types of transferred documents. For example, the operator can provide different billing rates for viewing MPEG files, JPEG files, electronically editable documents, and PDF files.

The mobile device 21, management server 20, or enterprise network 18 may also initiate an email synchronization operation. In this example, the synchronization is initiated by the mobile device 21 via email sync request 70D. The billing manager 26 may record the email sync request 70D as an entry 74D in billing record 74. In addition, or alternatively, the billing manager 26 may capture the transaction 77 generated by client 32 in response to the email sync request 70D. The billing manager 26 may then capture and record the email update label 77A attached to the updated email list 77B sent to mobile device 21 by enterprise client 32.

It is possible in other implementations that the enterprise client 32 does not attach the event labels 75A, 76A, 76B and 77A to transaction responses 72 and alternatively sends the event identifiers either separately or in a batch file back to billing manager 26 for further aggregation.

Of course the transaction requests 70 and transaction responses 72 in FIG. 3 are just examples of the many different types of events that can be sent, received, initiated, or associated with mobile device 21. Some, additional examples of mobile device events and event parameters that may be detected by the billing manager 26 or the enterprise client 32 are described below.

Event Data

The following are examples of different types of event data that may be captured and output for billing, auditing, or reporting purposes by the billing manager 26 or client 32. The specific events captured and made available to operators will vary depending upon what device clients and Internet Service Provider (ISP) data connectors are utilized, and what mobile operator settings are selected during initial configuration of the event table 35.

| Provisioning/User Management |
| --- |
| User account creation |
| User account suspension |
| User account reactivation |
| User account deletion |
| User profile update |
| User password change |
| User password reset |
| ISP account setup |
| ISP account suspension |
| ISP account reactivation |
| ISP account deletion |
| ISP account credential update |
| ISP protocol configured |
| User session activity |
| |
| Session start |
| Session end |
| Device/Browser type |
| Session ID |
| Mail |
| |
| Mail message viewed |
| Mail message sent |
| Mail message deleted |
| Mail message composed |
| Mail message replied |
| Mail message forwarded |
| Mail message marked unread/read |
| Mail attachment downloaded |
| Mail attachment transformed |
| Mail attachment faxed |
| Mail folder viewed |
| Mail folder created |
| Mail folder renamed |
| Mail folder deleted |
| Mail messages moved |
| Mail messages copied |
| Contacts |
| |
| Contact viewed |
| Contact search |
| Contact deleted |
| Contact added |
| Contact edited |
| Call initiated from contact |
| Mail message initiated from contact |
| Calendar |
| |
| Calendar viewed |
| Appointment viewed |
| Appointment deleted |
| Appointment added |
| Appointment edited |

Each event record may contain additional attributes which are event-specific. Events may also contain the attributes such as event_id, session_id, event time, device type, and mobile phone number.

Provisioning/User Management activity relates generally to account management operations that may be associated with the mobile device 21 (FIG. 3). For example, creating, suspending, reactivating, or deleting a user account or changing a user password. Similar information may be captured and recorded by the billing manager 26 for transactions associated with Internet Service Provider (ISP) accounts, such as suspending, reactivating, deleting, reconfiguring, etc., ISP accounts.

User Session Activity can include information such as when a communication session started, ended, what type of mobile device or browser was used during the session, and a session identifier. This information may be used for example, when a service provider wishes to provide a service plan based on the amount of time the mobile device 21 is connected to the enterprise network 18. The billing manager 26 or a connector (enterprise or personal client) in the enterprise network 18 may operate a timer that detects when the communication session is first initiated and when the session is terminated. This session information may be recorded separately or in combination with any of the other user events described above or that will be described further below.

The Mail category refers to particular activities associated with viewing or manipulating email data. For example, the billing manager 26 or the enterprise connector can detect email events such as viewing, deleting, composing, sending or replying to emails. Other activities requested and performed for attachments or facsimiles associated with the emails can also be captured as described above in FIG. 3. The mail activities can also include events associated with viewing or manipulating email folders.

The Contacts and Calendar activities are associated viewing or manipulating contact and calendar items in the enterprise network 18. For example, viewing, searching, deleting, creating or editing contact or appointment information.

The billing system can generate or track additional attributes for the different events described above. These additional attributes can include an event identifier, session identifier, event time, device type, or mobile telephone number associated with the captured event. These parameters can be used, for example, to provide billing plans that are based on the amount of time a user is using a particular service or device. Some events when appropriate may also contain attributes such as file size, Internet Service Provider (ISP) and service type, Multipurpose Internet Mail Extension (MIME) type, Internet Protocol (IP) address, etc.

Event Aggregation

Event aggregation reduces the volume of event data that may need to be transmitted to the operator billing system and facilitates trend analysis. Aggregation also allows an operator visibility into user activity by session, to facilitate counts of billable events.

If the operator utilizing aggregated event data wishes greater per-event detail, aggregation can be customized to preserve the desired per-event attribute data. This data may be accessed through standard outputs, such as billing records, session logs, audit logs, or reports. Optionally, an operator may wish to utilize custom billing adapters as described in FIG. 2 to extract the underlying aggregated event data and format it for transmission to one or more billing data collectors.

Figure 4:
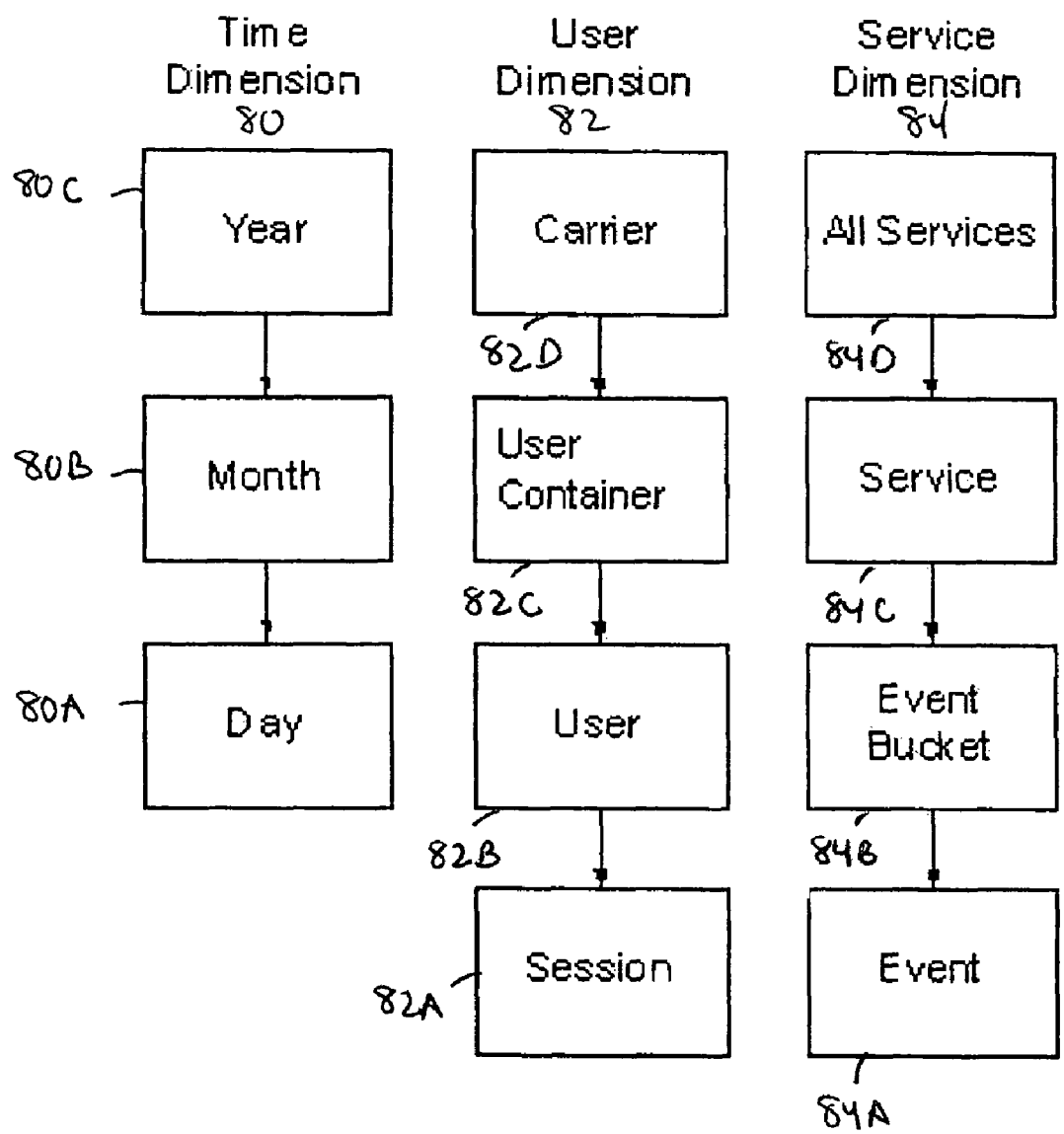
FIG. 4 is a flow diagram showing how captured events can be aggregated over different dimensions.
Figure 9:
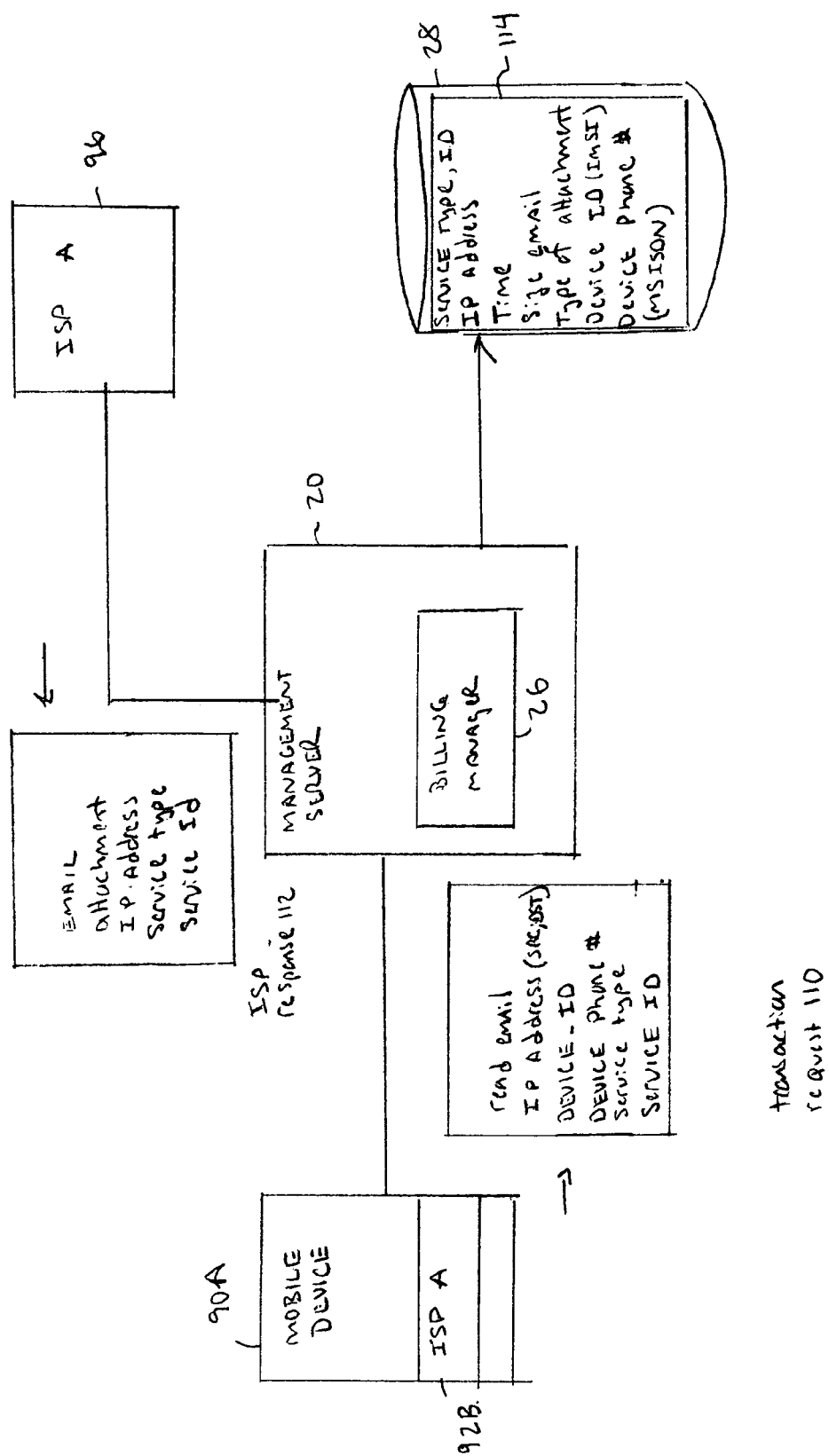

FIG. 4 shows some of the different types of aggregation that allow the billing system to scale to a larger number of events per day. Aggregated, or not, the event data can be organized in multiple different dimensions. In this example, the event data is organized into any combination of user 82, service 84, and time 80 dimensions. Event counts are represented as measures, and the lowest-level at which event data is recorded in the standard aggregated view is per-session.

The user dimension 82 can identify different user sessions 82A and user profile fields. The sessions 82A belong to users so the sessions for a particular user can be aggregated in user 82B. Then at an enterprise level, all of the aggregated user information 82B for a particular enterprise can be aggregated in user container 82C. All the user information for a particular carrier 82D can then be aggregated together.

The service dimension 84 provides detail on individual events and types of events 84A. The events are aggregated into an event bucket 84B and then aggregated according to which protocols, ISP connectors, and other services 84C are used. Then all services in the system can be aggregated together.

The time dimension 80 provides rollup from hours and minutes to days 80A, months 80B, and years 80C. For example, all the events that happen in a day 80A, month 80B, or year 80C, etc. may be aggregated together.

The aggregation process can execute several times throughout the day to ensure that event data is made available without unreasonable delay. Some operators, however, may require access to real-time event data. To facilitate such data collection, billing adapters allow real-time transmission of un-aggregated event data to an operator's billing collection system. For example, the billing manager 26 can automatically send the captured event data 42 to a remote server via a TCP/IP connection or FTP file transfer.

Billing Models

Through the use of billing adapters and access to aggregated and un-aggregated event data, the billing manager 26 can support any combination of billing models, including service-based; event-based; time-based; and session-based.

Service Based Billing

FIG. 5 shows one example of how service-based billing records may be generated to provide the operator information necessary to bill users on a periodic basis for subscribed services. In order to facilitate this, the billing manager 26 may utilize the following captured data:

User account is provisioned;
User service configuration is changed;
User account is deleted;
ISP service is provisioned;
ISP service configuration is changed; and
ISP service is deleted.

In this example, a same user A operates two different mobile devices 90A and 90B. Of course this is just one example, and the user A may only operate a single mobile device 90 or may operate more than two mobile devices. The mobile device 90A may be owned by a company that employs user A and mobile device 90B may be personally owned by user A.

User A may provision multiple different services on mobile device 90A. For example, the mobile device 90A may be provisioned with three different services, a first enterprise service 92A, a second email service 92B provided by an Internet Service Provider (ISP) 96, and a third email service 92C provided by an ISP 98. The personal mobile device 90B for user A may be configured with the same email service 92C configured on mobile device 90A.

The billing manager 26 identifies all of the raw event data needed to capture and track all of the services provisioned by user A both on device 90A or 90B. For example, the billing manager 26 separates all email events exchanged between device 90A and ISP 96 in email account 92B into report 106A in data 106. Similarly, the billing manger 26 can separate all of the events exchanged between mobile device 90A and enterprise network 104 into report 106C in data 106. The billing manger 26 can also separate all of the email events exchanged between both mobile devices 90A and 90B and ISP 98 for email account 92C into report 106B.

The data 106 allows the operator and service providers 96 and 98 to provide more flexible billing plans. For example, the operator using management server 20 can provide joint billing plans with one or more of the ISPs 96 and 98 where a discounted rate is provided for email access to the ISP service. Alternatively, the operator may provide a discount when the same email service is configured on two different mobile devices 90A and 90B operated by the same user.

In addition, one of the internet services 96 or 98 may have a flat rate billing plan, and the other an event-based billing plan. The billing manger 26 can capture the different events that are required to support the two different billing plans.

For example, ISP 98 may bill at a flat rate and therefore only needs session and service event tracking. The ISP 96, on the other hand, may not charge for viewing email but may charge users for sending email or downloading attachments. The billing manager 26 captures these individual email events so that the ISP 96 can provide this event-based billing plan.

The event data associated with the enterprise service 92A may use yet another billing plan that can also be supported by the separate enterprise entries in report 106C in captured event data 104. All of the different reports 106 in reporting database 28 can then be separately formatted and supplied to the different service providers.

Some communication events may inform the operator that a change in billing may be required. The mobile operator 26 may then start or stop billing of a particular user or enterprise, or change the fee based upon a service change. Capturing user and ISP service configurations allows the operator to charge different rates depending on the number or kind of services (e.g. Yahoo, AOL) enabled. For example, user A may get reduced per service provider rate when more than one service is provisioned. In the service-based billing scheme, operators may also charge additional (flat) fees for add-ons such as use of one or more device clients, email push capability, etc.

User and Service Identification

Referring to FIG. 6, the mobile device 90A is configured to operate with the email service 92B provided by ISP 96. The user of mobile device 90A may send an email read request 110 via management server 20 to ISP 96. The billing manger 26 identifies particular parameters associated with the email read request 110 that associate the request 110 with a particular user and with a particular service.

For example, the billing manager 26 may identify an IP address, device identifier, and/or phone number for mobile device 90A. The device identifier may be an International Mobile Subscriber Identity (IMSI) value and the phone number may be a Mobile Station International Integrated Services Digital Network (MSISDN) value.

The billing manager 26 may use the source IP address contained in the transaction request 110 to associate the event with a particular mobile IP phone or IP device that does have an associated device identification number or phone number. In this case, the billing manager 26 may also track the time of when request 110 was detected. This allows the billing manager 26 to determine what user was assigned the IP address at the time of request 110. Since IP addresses may be assigned to different users over time, tracking both the IP address and time allows the billing manager 26 to more accurately identify the user initiating request 110. This user information is extracted or derived from transaction request 110 and entered into a report 114 in reporting database 28.

The billing manager 26 can also supplement the report 114 with information related to the service 92B used by mobile device 90A. For example, the billing manager 26 can extract a service type value from either request 110 or response 112 that identifies the service provider 96. The billing manger 26 can also extract a service identifier that is associated with a particular account in ISP 96. This service related information can also be captured and stored in report 114.

As described above, the billing manager 26 can also capture events from the transaction 112 sent back from ISP 96 to mobile device 90A in response to request 110. This allows the billing manager 26 to extract additional parameters related to the transaction. For example, the billing manger 26 may extract the size of the email and any attachments in response 112.

Event-Based Billing

Event-based billing was previously described in FIG. 3 and provides the information necessary to bill subscribers on a periodic basis for each chargeable action. The billing manager 26 may use any of the event categories described above or described in FIG. 8 to extract any combination of event data. Examples of potentially billable events include access to content (e.g. mail, contacts) from a particular ISP, voice call initiated from a contact lookup; email message retrieved; email message sent. Event-based billing records typically include actions that the operator has identified as billable, and may exclude other events that are not being billed.

Time-Based Billing

Time-based billing provides the operator the information necessary to bill subscribers on a periodic basis for the amount of time spent connected to the communication management system 16 or to a particular service. The billing manager 26 may utilize events such as the following for its determination of connection time: browser-session login; browser-session logout or timeout; sync session initiated; and device client sync session completed. These billing events are added to an associated user billing account. Time-based billing records may include type of activity and session duration.

Session-Based Billing

Session-based billing is used to bill subscribers on a periodic basis for the number of sessions opened to interact with the communication management system 16. The billing manager 26 may utilize event data such as browser-session login; browser-session logout or timeout; device client sync session initiated; and device client sync session completed. These session-based billing events are added to and associated user account. Session-based billing records can include type of activity and session count.

Combined Billing

Operators may wish to utilize different billing models concurrently. For example, some users may be billed on a service-basis, while others may be billed on an event-basis. In a standard configuration, the billing manager 26 may capture and aggregate event data for all end users. Depending upon the type of billing model chosen by the operator and the chosen billing adapters, it may be preferable for the billing manager 26 to output a single consolidated billing record that can then be used to generate subscriber charges under all supported billing models. If not, billing adapters may be modified to generate billing records customized for the appropriate user populations.

Report Formats and Transmission

The format of billing records can be varied to satisfy mobile operator requirements. Operators deploying the communication management system 16 for example may chose a Comma Separated Values (CSV) flat file; tab-delimited flat file; Call Detail Record (CDR) or Internet Protocol Detail Record (IPDR), including support for compact or Extensible Markup Language (XML) data formats; or custom-format records or transmission.

Transmission of billing records may be accomplished through open standards such as TCP-based Secure Shell Version 2 (SSH2), File Transport Protocol (FTP), and Trivial File Transport Protocol (TFTP), etc. Alternatively, the billing records may be transmitted through User Datagram Protocol (UDP)-based datagrams, or other protocols, as needed, to integrate with existing operator billing systems. Data transmission can utilize Transport Layer Security (TLS) or IP Security (IPsec) to ensure security and integrity of communication. Once confirmed that the desired billable events are recorded by the billing manager 26, operators then specify integration requirements for billing record output and delivery.

FIG. 7 shows an example where an operator utilizes event-based billing on top of aggregation by session with the event data formatted into an IPDR/File standard. The billing record in FIG. 7 has been generated for a time period containing activity for two users, "juser" and "sammy7". The IPDRDoc metadata is included, showing a total count of events contained in this IPDRDoc, namespace and schema definitions, document ID, and creation time.

In this example, billable events are aggregated by session. Consequently, per-session attributes such as sessionild, start-Time, endTime, and device are provided with each IPDR. User information such as username, Mobile Identification Number (MIN), and Network Address Identifier (NAI) are also shown here. Specific fields utilized to uniquely identify a user will depend upon operator requirements and level of integration with operator provisioning and billing systems. As noted above, the billing manager 26 can be extended to store and output custom attributes fields that have not been discussed above.

The billable events shown in FIG. 7 are a subset of the events tracked by the billing manager 26. In this example, the operator may have configured billing manger 26 to charge users based upon the frequency of actions during each user session. Each billable event has been given an easily identifiable name. For example, an event associated with viewing a mail folder "mailFolderViews", delivering a message "messagesDelivered"; sending a message "messagesSent"; messages sent with attachments "messagesSentWithAttachments"; and viewing the attachment "attachmentsViewed". More compact representations are also possible if data volume is a concern.

Categorizing Captured Events

FIG. 8 shows in more detail the event table 35 previously referred to in FIGS. 1 and 3. The event table 35 allows events and/or event attributes to be quickly and flexibility categorized into service and non-service events. Service events correspond with direct end user actions and non-service events correspond with administrator generated actions, such as an event generated by the communication management system 16 (FIG. 1). As described above, there are extra attributes that can be tracked for both service and non-service events. For example, a timestamp may be used to indicate when the action causing the event occurred or how long a user accessed a service.

Referring back to FIG. 3, in the case of sync messages, the timestamp may refer to the time returned by the connector (enterprise client 32) for the event. For example, enterprise client 38 in the enterprise network 18 in FIG. 1 may generate the event times corresponding with the sync message 70D sent by mobile device 21. Alternatively, the event times may be generated by the management server 20 upon receiving the sync message or the response transaction 77. When the sync message is end-to-end or sent to an ISP, the event time may be generated and tracked by the management server 20. Hence the time the event occurs may not necessarily be the actual time the user action was initiated.

Extensibility

As also described above, the billing system may be extended to operate outside of the communication management system 16. This may be necessary to support tracking of additional events requested by operators. For example, in FIGS. 1 and 3, the enterprise client 32 in enterprise network 18 or the device client 23 in mobile network 14 may capture events where applicable and either independently generate billing records or send the captured events to billing manager 26 in management server 20 for supplementing billing data 44 or 46.

The billing manager 26 may also be extended to store additional custom data fields specified by the operator on a per-user, per ISP, or per instance basis. Examples of such custom attributes include customer type or billing code, device International Mobile Equipment Identify (IMEI) or International Mobile Subscriber Identify (IMSI); Subscriber ID; Network Access Identifier; device type and firmware revision; Digital Rights Management (DRM) information, transport bearer information, etc. Storage of custom field data typically requires integration with the operator infrastructure or designated vendors. Such extensibility enables support for a wider variety of mobile operator billing plans.

The invention claimed is:

1. A communication management system, comprising:
at least one processor configured to identify different communication events and parameters associated with a mobile device according to a configurable event tracking table, the at least one processor configured to combine the identified communication events and parameters into a billing report;
wherein the processor is configurable through the event tracking table to separately identify individual service based events that correspond with direct mobile device actions or non-service events that correspond with administrator generated actions;
wherein the separately identified individual service based events include separate different individual data access events used for viewing and editing email, contact, appointment, and data files and the non-service events include activating and deactivating a mobile network access account; and
the mobile device configured to generate transaction requests including different event codes that each uniquely identify a different one of the viewing and editing of the email, contact, appointment, and data files, and the activating and deactivating of the mobile network access account and transmit the transaction requests over the mobile network;
wherein the separate different individual data access events and non-service events are contained in the transaction requests received at the at least one processor; and
wherein the billing report itemizes the different ones of the viewing and editing of the email, contact, appointment, or data files, and the activating and deactivating of the mobile network access account according to the event codes contained in the transaction requests.

2. The communication management system according to claim 1, wherein:
the identified service based events include a user viewing an email message, a user composing the email message, a user viewing an attachment in the email message, a user viewing a calendar, and a user editing the calendar; and at least some of the transaction requests include different event code values that each uniquely identify a different one of the service based events including the user viewing the email message, the user composing the email message, the user viewing the attachment in the email message, the user viewing the calendar, and the user editing the calendar.

3. The communication management system according to claim 2, wherein:

at least some of the transaction requests include event codes that uniquely distinguish and identify requests from the mobile device for different email, calendar, and address book viewing operations and different email, calendar, and address book editing operations; and the billing report separately itemizes each of the different email, calendar, and address book viewing operations and each of the different email, calendar, and address book editing operations according to the event codes.

4. The communication management system according to claim 1, wherein the billing report identifies when or how long the mobile device is connected to an enterprise network or service.

5. The communication management system according to claim 1, wherein the at least one processor is configurable to categorize the identified events into service-based billing reports that identify different services used by the mobile device.

6. The communication management system according to claim 5, wherein the at least one processor is configured to identify Internet Service Providers (ISPs) associated with some of the events and generate ISP billing reports containing the events associated with the same identified ISPs.

7. The communication management system according to claim 5, wherein the at least one processor is configured to combine only those identified events associated with a particular service identifier and a particular user identifier into a user billing report.

8. The communication management system according to claim 1, wherein the at least one processor is configured to categorize the identified events into session-based billing reports according to wireless sessions established by the mobile device.

9. The communication management system according to claim 8, wherein the session-based billing reports include a session start time, session end time, and session identifier for the identified sessions.

10. The communication management system according to claim 1, wherein the at least one processor is configured to aggregate the identified event data according to associated user identifiers, event identifiers, service identifiers, or session identifiers.

11. A method for tracking billing events using a computer system, comprising:

identifying communications associated with a mobile device with the computer system, the communications comprising a plurality of separate wireless sessions according to a configurable event tracking table, combining the identified communications and parameters into a billing report;

identifying with the computer system different types of service related events in the communications and non-service related events associated with system administration related events;

outputting in real-time or in a batch mode billing information from the computer system that identifies particular ones of the different types of service related events and non-service related events in the communications;

wherein the service related events include separate different individual data access events used for viewing and editing email, contact, appointment, and data files and the non-service related events include activating and deactivating a mobile network access account;

wherein a plurality of the different types of service related events are received from the mobile device and comprise different particular types of electronic mail access requests that are each identified by different associated event codes, the different associated event codes each uniquely identify a different one of the viewing and editing of the email, contact, appointment, and data files, and the activating and deactivating of the mobile network access account;

wherein the event codes are assigned by the mobile device and transmitted from the mobile device to the computer system over a mobile network; and wherein the billing information output from the computer system itemizes the different ones of the viewing and editing of the email, contact, appointment, or data files, and the activating and deactivating of the mobile network access account according to the event codes contained in the transaction requests.

12. The method according to claim 11, including distinguishing between different types of user sessions, enterprise sessions, or service sessions in the non-service related events.

13. The method according to claim 12, including generating billing reports indicating a non-service session is added, deleted, suspended, activated, or reactivated.

14. The method according to claim 11, including:
identifying an event that requests sending or viewing a file;
identifying the size of the sent file associated with the event; and
identifying the send or view event and the size of the associated file in a billing report.

15. The method according to claim 11, including:
identifying a file request event;
identifying a type of file transferred pursuant to the file request event; and
billing for the file transfer according to the type of identified file.

16. The method according to claim 11, including categorizing events in the billing information according to a service type identifier and a user identifier associated with the events.

17. The method according to claim 16, including using a mobile device identifier, mobile device phone number or an IP address as the user identifier.

18. The method according to claim 11, including aggregating the service and non-service related events according to different user, service, or time categories.

19. The method according to claim 11, including generating a billing report that identifies a number of the wireless sessions independently of how long the mobile device is connected in the wireless sessions.

20. The communication management system according to claim 1, wherein a plurality of the service based events are identified as part of a single wireless session of the mobile device.

21. The communication management system according to claim 1, wherein the direct mobile device actions are forwarded to an enterprise network which is configured to perform the service based events.

* * * * *